US012574828B2

(12) United States Patent
Huang et al.

(10) Patent No.: US 12,574,828 B2
(45) Date of Patent: Mar. 10, 2026

(54) TIME-FREQUENCY INTERLEAVED SS PBCH FOR RADAR COEXISTENCE AND INTERFERENCE COORDINATION

(71) Applicant: INTERDIGITAL PATENT HOLDINGS, INC., Wilmington, DE (US)

(72) Inventors: Joe Huang, Montville, NJ (US); Sudhir Pattar, Mount Laurel, NJ (US); Philip Pietraski, Jericho, NY (US); Tariq Elkourdi, Belleville, NJ (US); Daniel Steinbach, Commack, NY (US); Phillip Leithead, King of Prussia, PA (US); Jane Mack, Melville, NY (US)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 383 days.

(21) Appl. No.: 18/141,228

(22) Filed: Apr. 28, 2023

(65) Prior Publication Data

US 2023/0354158 A1      Nov. 2, 2023

Related U.S. Application Data

(60) Provisional application No. 63/336,897, filed on Apr. 29, 2022.

(51) Int. Cl.
*H04W 48/08*          (2009.01)
*H04L 1/00*          (2006.01)
*H04W 74/0833*          (2024.01)
(52) U.S. Cl.
CPC ........... *H04W 48/08* (2013.01); *H04L 1/0071* (2013.01); *H04W 74/0833* (2013.01)

(58) Field of Classification Search
CPC .. H04W 48/08; H04W 74/0833; H04L 1/0071
(Continued)

(56) References Cited

U.S. PATENT DOCUMENTS

2019/0364599 A1*  11/2019  Islam .................... H04L 5/0048
2022/0085906 A1*   3/2022  Lovlekar ............... H04W 76/27
(Continued)

OTHER PUBLICATIONS

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6GHz, IEEE Std 802.11ac-2013 (Dec. 11, 2013).

(Continued)

*Primary Examiner* — Michael R Neff
(74) *Attorney, Agent, or Firm* — VOLPE KOENIG

(57) ABSTRACT

The system and method detect at least one cell defining SSB (CD-SSB), extract information associated with at least one other CD-SSB, the information including at least the absoluteFrequencyotherSSBs for the at least one other CD-SSB, extract an absoluteFrequencySSB from a network, determine if absoluteFequencySSB is in a list of absoluteFrequencyotherSSBs and if so, the CD-SSB indicated by the absoluteFrequencySSB, read the SIB1 associated with the CD-SSB indicated by the absoluteFrequencySSB and perform random access using RACH resources corresponding to the read SIB1. The system and method may further include if the absoluteFrequencySSB is determined to not be in the list of absoluteFrequencyotherSSBs, read at least one SIB1 associated with at least one other CD-SSB indicated by an absoluteFrequencyotherSSB in the list of absoluteFrequencyotherSSBs and perform random access using RACH resources corresponding to the read at least one SIB1.

20 Claims, 20 Drawing Sheets

(58) Field of Classification Search
USPC ........................................................ 455/434
See application file for complete search history.

(56) References Cited

U.S. PATENT DOCUMENTS

| | | | | |
|---|---|---|---|---|
| 2022/0225248 A1* | 7/2022 | Landis | .................. | H04W 24/10 |
| 2022/0279553 A1* | 9/2022 | Mu | ....................... | H04W 48/12 |
| 2022/0408224 A1* | 12/2022 | Sun | .................. | H04W 56/0015 |

OTHER PUBLICATIONS

IEEE Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Television White Spaces (TVWS) Operation, IEEE 802.11af-2013 (Dec. 11, 2013).

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).

IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 2: Sub 1 GHz License Exempt Operation, IEEE 802.11ah-2016 (Dec. 7, 2016).

IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2020 (Dec. 3, 2020).

Third Generation Partnership Project, "Technical Specification Group Radio Access Network; NR; Physical layer procedures for control (Release 15)," 3GPP TS 38.213 V15.12.0 (Dec. 2020).

Third Generation Partnership Project, "Technical Specification Group Radio Access Network; NR; Physical layer procedures for control (Release 17)," 3GPP TS 38.213 V17.1.0 (Mar. 2022).

Third Generation Partnership Project, "Technical Specification Group Radio Access Network; NR; Physical layer procedures for control (Release 17)," 3GPP TS 38.213 V17.5.0 (Mar. 2023).

Third Generation Partnership Project, "Technical Specification Group Radio Access Network; NR; NR and NG-RAN Overall Description; Stage 2 (Release 15)," 3GPP TS 38.300 V15.12.0 (Mar. 2021).

Third Generation Partnership Project, "Technical Specification Group Radio Access Network; NR; Radio Resource Control (RRC) protocol specification (Release 17)," 3GPP TS 38.331 V17.4.0 (Mar. 2023).

Third Generation Partnership Project, "Technical Specification Group Radio Access Network; NR; Radio Resource Control (RRC) protocol specification (Release 17)," 3GPP TS 38.331 V17.0.0 (Mar. 2022).

Third Generation Partnership Project, "Technical Specification Group Radio Access Network; NR; Radio Resource Control (RRC) protocol specification (Release 15)," 3GPP TS 38.331 V15.12.0 (Dec. 2020).

Third Generation Partnership Project, "Technical Specification Group Radio Access Network; NR; NR and NG-RAN Overall Description; Stage 2 (Release 17)," 3GPP TS 38.300 V17.0.0 (Mar. 2022).

Third Generation Partnership Project, "Technical Specification Group Radio Access Network; NR; NR and NG-RAN Overall Description; Stage 2 (Release 17)," 3GPP TS 38.300 V17.40.0 (Mar. 2023).

* cited by examiner

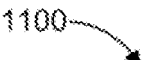

1100

| Detecting At Least One Cell Defining SSB (CD-SSB) | 1110 |

↓

| Extracting Information From The Detected CD-SSB To Determine A Presence Of Other CD-SSBs | 1120 |

↓

| Extracting An Indication From The Detected CD-SSB That The Detected CD-SSB Is To Be Removed | 1130 |

↓

| Reading A SIB Associated With The Detected CD-SSB To Extract At Least Frequency Location Information Associated With At Least One Other CD-SSB | 1140 |

↓

| Reading A SIB Associated With The At Least One Other CD-SSB | 1150 |

↓

| Performing Random Access Using RACH Resources Corresponding To The Read SIB | 1160 |

FIG. 11

TIME-FREQUENCY INTERLEAVED SS PBCH FOR RADAR COEXISTENCE AND INTERFERENCE COORDINATION

CROSS-REFERENCE TO RELATED APPLICATIONS

This application which claims the benefit of U.S. Provisional Application No. 63/336,897 filed Apr. 29, 2022, which is incorporated by reference as if fully set forth.

STATEMENT OF GOVERNMENT RIGHTS

This invention was made with government support under project NSC-20-2084: Dynamic Spectrum Sharing 5G networks enhancement prototype, also known as ENhanced SecURity and co-Existence for DoD—5G (ENSURED-5G); OTA Number W15QKN-15-9-1004, Base and Project Agreement 2017-314A-Mod-03, Subcontract 2021-01. The government has certain rights in the invention.

BACKGROUND

Cell defining Synchronization Signal Bursts (SSBs) and related Master Information Block (MIB) and System Information (SI) Block 1 (SIB1) are key for the WTRUs to perform initial access procedures. Corrupted SSB bursts due to overlapping high-power narrowband interferer such as RADAR in time and frequency domains must be avoided in wireless communication systems especially in 5G cellular deployments.

Generally, only a single initial Bandwidth Part (BWP) per cell is allowed. Each cell is associated with one cell defining SSB block that leads to reading SIB1 parameters although multiple SSB blocks may be defined for other purposes. Emerging WTRUs may go through a synchronization process by using cell defining SSB blocks which are transmitted in the initial BWP. The initial BWP contains System Information, paging, Physical Random Access Channel (PRACH) related channels. In general, the SSB blocks may be narrower compared to the overall carrier bandwidth and the number of RBs used for SSB blocks may not cover the entire initial BWP. The number of RBs may be set by the network for SSB block to 24, 48, or 96. For example, the largest Synchronization and Broadcast Channel combination (SS_PBCH) bandwidth is 34,560 MHz for Subcarrier Spacing (SCS) of 30 kHz.

When a narrow-band high power interferer, such as RADAR interferes with an initial BWP where SSB transmission, system information exchange, PRACH, and paging related signaling contained, the WTRUs may not be able to detect the synchronization signals and decode the system information, access to the network, and decode the paging signals due to high level of interference. If the RADAR interference overlaps with the initial BWP, not only are the emerging WTRUs prevented from accessing the network, but the camped WTRUs may be prevented from reading System Information updates, paging messages, and performing RACH over the initial BWP.

In a cellular deployment scenario, the WTRUs either emerging in the coverage area or already camped on the cell may experience destructive impact due to narrowband high-power interferers such as RADAR. It is imperative that the presence and characteristics of RADAR interference are identified before cellular system starts suffering.

To this end, there is a need to introduce a more resilient SSB framework that avoids a single point of failure to cope with a RADAR interference overlapping in time and frequency domains with the cellular carrier band especially affecting cell defining SSBs in the initial BWP.

SUMMARY

A system, device and method are disclosed. The system includes a transceiver and a processor operably coupled to the transceiver. The system and method detect at least one cell defining SSB (CD-SSB), extract information associated with at least one other CD-SSB, the information including at least the absoluteFrequencyOtherSSBs for the at least one other CD-SSB, receive an absoluteFrequencySSB from a network, determine if the received absoluteFrequencySSB is in a list of absoluteFrequencyOtherSSBs and the at least one other CD-SSB indicated by the received absoluteFrequencySSB, read the SIB1 associated with the determined at least one other CD-SSB and perform random access using RACH resources corresponding to the read SIB1. The system and method may further include if the received absoluteFrequencySSB is determined to not be in the list of absoluteFrequencyOtherSSBs, read at least one SIB1 associated with at least one other CD-SSB indicated by an absoluteFrequencyOtherSSB in the list of absoluteFrequencyOtherSSBs and perform random access using RACH resources corresponding to the read at least one SIB1. The system and method may include verifying a flag indicating the ability to operate with multiple cell defining SSBs is set. The system and method may include the receiving the absoluteFrequencySSB from the network is based on the network updating the absoluteFrequencySSB on the CD-SSB impacted by interference, including where the interference is by RADAR. The system and method may include a first of the CD-SSBs and a second of the CD-SSBs transmissions are interleaved in the time domain, including interleaving with a frame offset of zero and a half bit offset of one and/or a frame offset of one and a half bit offset of zero. The system and method include receiving at least one short message paged using a coreset of the at least on CD-SSB including where the at least one short message is received within the DRX cycle and the at least one short message indicates an SI notification.

A wireless transmit and receive unit (WTRU) and method are described. The WTRU include a transceiver and a processor operably coupled to the transceiver. The method and WTRU includes detecting at least one cell defining SSB (CD-SSB), extracting information from the detected CD-SSB, such as MIB, for example, to determine a presence of other CD-SSBs, extracting an indication from the detected CD-SSB, such as MIB, for example, that the detected CD-SSB is to be removed, reading a SIB, such as SIB1, for example, associated with the detected CD-SSB to extract at least frequency location information associated with at least one other CD-SSB, reading a SIB, such as SIB1, for example, associated with the at least one other CD-SSB, and performing random access using RACH resources corresponding to the read SIB1.

The method and WTRU may include, if the detected CD-SSB is to be removed and there are other CD-SSBs, reading at least one SIB1 associated with at least one other CD-SSB indicated by the SIB1 of the detected CD-SSB and performing random access using RACH resources corresponding to the read at least one SIB1. The method and WTRU may include, if a SSB frequency location indicated in the SIB1 of the detected CD-SSB is in a list of SSB frequency locations of other CD-SSBs, reading the SIB1 associated with the CD-SSB with frequency location indicated in the SIB1 of the detected CD-SSB, and perform random access using RACH resources corresponding to the read SIB1. The method and WTRU may include the SSB frequency location indicated in the SIB1 associated with a CD-SSB is updated based on the CD-SSB being impacted by interference. The method and WTRU may include interference is by RADAR. Method 1100 may include sending a flag indicating the ability to operate with multiple cell defining SSBs. The method and WTRU may include transmission of a first of the CD-SSBs and a second of the CD-SSBs are interleaved in a time domain. The method and WTRU may include the interleaving includes a frame offset and a half bit offset. The method and WTRU may include receiving at least one short message paged using a coreset of the at least one CD-SSB. The method and WTRU may include the at least one short message is received within a DRX cycle and the at least one short message indicates an SI modification notification.

BRIEF DESCRIPTION OF THE DRAWINGS

A more detailed understanding may be had from the following description, given by way of example in conjunction with the accompanying drawings, wherein like reference numerals in the figures indicate like elements, and wherein:

FIG. 11 illustrates a method performed in a WTRU;

DETAILED DESCRIPTION

Figure 1A:
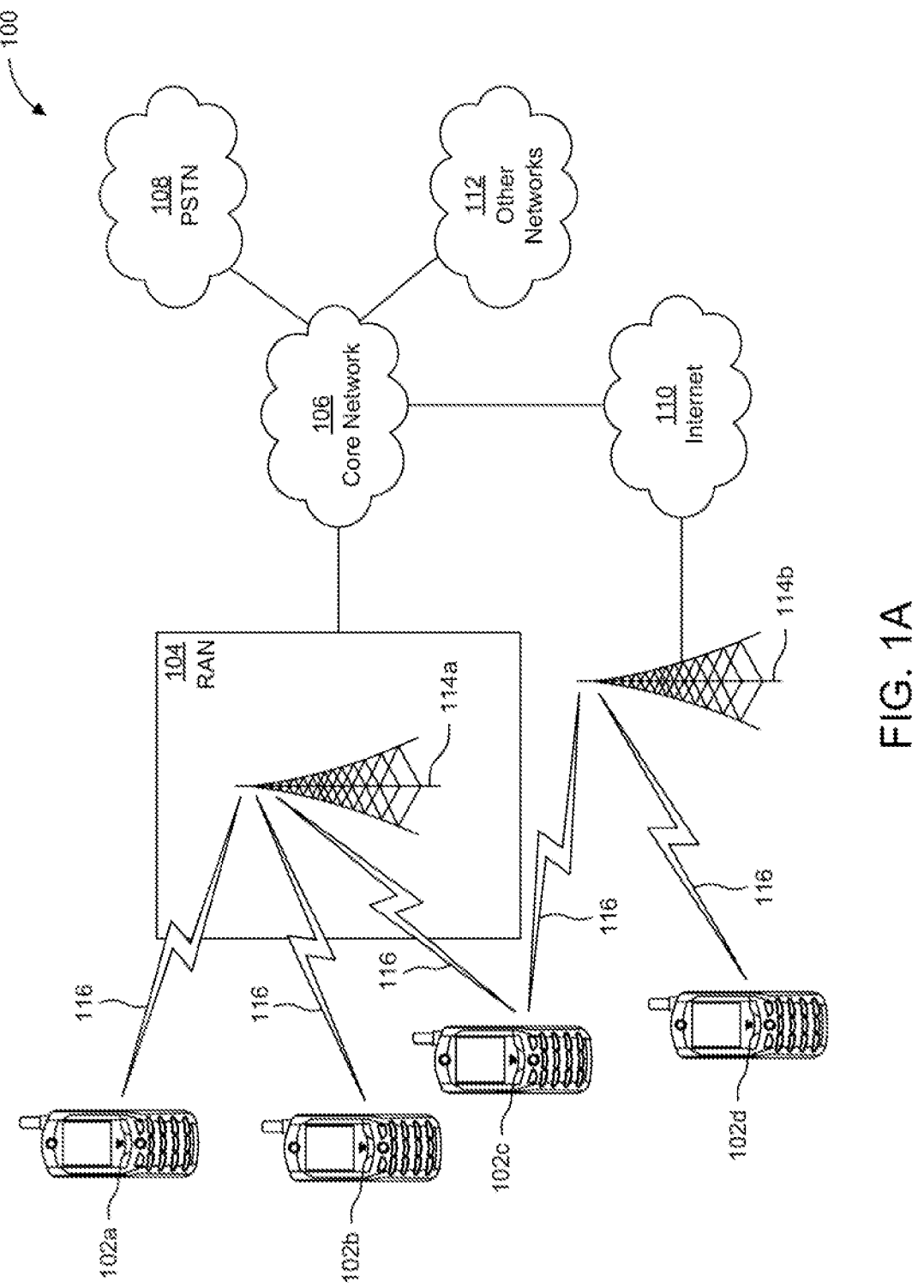
FIG. 1A is a system diagram illustrating an example communications system in which one or more disclosed embodiments may be implemented.

A system, device and method are disclosed to introduce a more resilient SSB framework that avoids a single point of failure to cope with a RADAR interference overlapping in time and frequency domains with the cellular carrier band especially affecting cell defining SSBs in the initial BWP. The system includes a transceiver and a processor operably coupled to the transceiver. The system and method detect at least one cell defining SSB (CD-SSB), extract information associated with at least one other CD-SSB, the information including at least the absoluteFrequencyOtherSSBs for the at least one other CD-SSB, receive an absoluteFrequencySSB from a network, determine if the received absoluteFrequencySSB is in a list of absoluteFrequencyOtherSSBs and the at least one other CD-SSB indicated by the received absoluteFrequencySSB, read the SIB1 associated with the determined at least one other CD-SSB and perform random access using RACH resources corresponding to the read SIB1. The system and method may further include if the received absoluteFrequencySSB is determined to not be in the list of absoluteFrequencyOtherSSBs, read at least one SIB1 associated with at least one other CD-SSB indicated by an absoluteFrequencyOtherSSB in the list of absoluteFrequencyOtherSSBs and perform random access using RACH resources corresponding to the read at least one SIB1. The system and method may include verifying a flag indicating the ability to operate with multiple cell defining SSBs is set. The system and method may include the receiving the absoluteFrequencySSB from the network is based on the network updating the absoluteFrequencySSB on the CD-SSB impacted by interference, including where the interference is by RADAR. The system and method may include a first of the CD-SSBs and a second of the CD-SSBs transmissions are interleaved in the time domain, including interleaving with a frame offset of zero and a half bit offset of one and/or a frame offset of one and a half bit offset of zero. The system and method include receiving at least one short message paged using a coreset of the at least on CD-SSB including where the at least one short message is received within the DRX cycle and the at least one short message indicates an SI notification.

A wireless transmit and receive unit (WTRU) and method are described. The WTRU include a transceiver and a processor operably coupled to the transceiver. The method and WTRU includes detecting at least one cell defining SSB (CD-SSB), extracting information from the detected CD-SSB, such as MIB, for example, to determine a presence of other CD-SSBs, extracting an indication from the detected CD-SSB, such as MIB, for example, that the detected CD-SSB is to be removed, reading a SIB, such as SIB1, for example, associated with the detected CD-SSB to extract at least frequency location information associated with at least one other CD-SSB, reading a SIB, such as SIB1, for example, associated with the at least one other CD-SSB, and performing random access using RACH resources corresponding to the read SIB1.

The method and WTRU may include, if the detected CD-SSB is to be removed and there are other CD-SSBs, reading at least one SIB1 associated with at least one other CD-SSB indicated by the SIB1 of the detected CD-SSB and performing random access using RACH resources corresponding to the read at least one SIB1. The method and WTRU may include, if a SSB frequency location indicated in the SIB1 of the detected CD-SSB is in a list of SSB frequency locations of other CD-SSBs, reading the SIB1 associated with the CD-SSB with frequency location indicated in the SIB1 of the detected CD-SSB, and perform random access using RACH resources corresponding to the read SIB1. The method and WTRU may include the SSB frequency location indicated in the SIB1 associated with a CD-SSB is updated based on the CD-SSB being impacted by interference. The method and WTRU may include interference is by RADAR. Method 1100 may include sending a flag indicating the ability to operate with multiple cell defining SSBs. The method and WTRU may include transmission of a first of the CD-SSBs and a second of the CD-SSBs are interleaved in a time domain. The method and WTRU may include the interleaving includes a frame offset and a half bit offset. The method and WTRU may include receiving at least one short message paged using a coreset of the at least one CD-SSB. The method and WTRU may include the at least one short message is received within a DRX cycle and the at least one short message indicates an SI modification notification.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word discrete Fourier transform Spread OFDM (ZT-UW-DFT-S-OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a radio access network (RAN) 104, a core network (CN) 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a station (STA), may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (I) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106, the Internet 110, and/or the other networks 112. By way of example, the base stations 114a, 114b may be a base transceiver station (BTS), a NodeB, an eNode B (eNB), a Home Node B, a Home eNode B, a next generation NodeB, such as a gNode B (gNB), a new radio (NR) NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, and the like. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed Uplink (UL) Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using NR.

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106.

The RAN 104 may be in communication with the CN 106, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
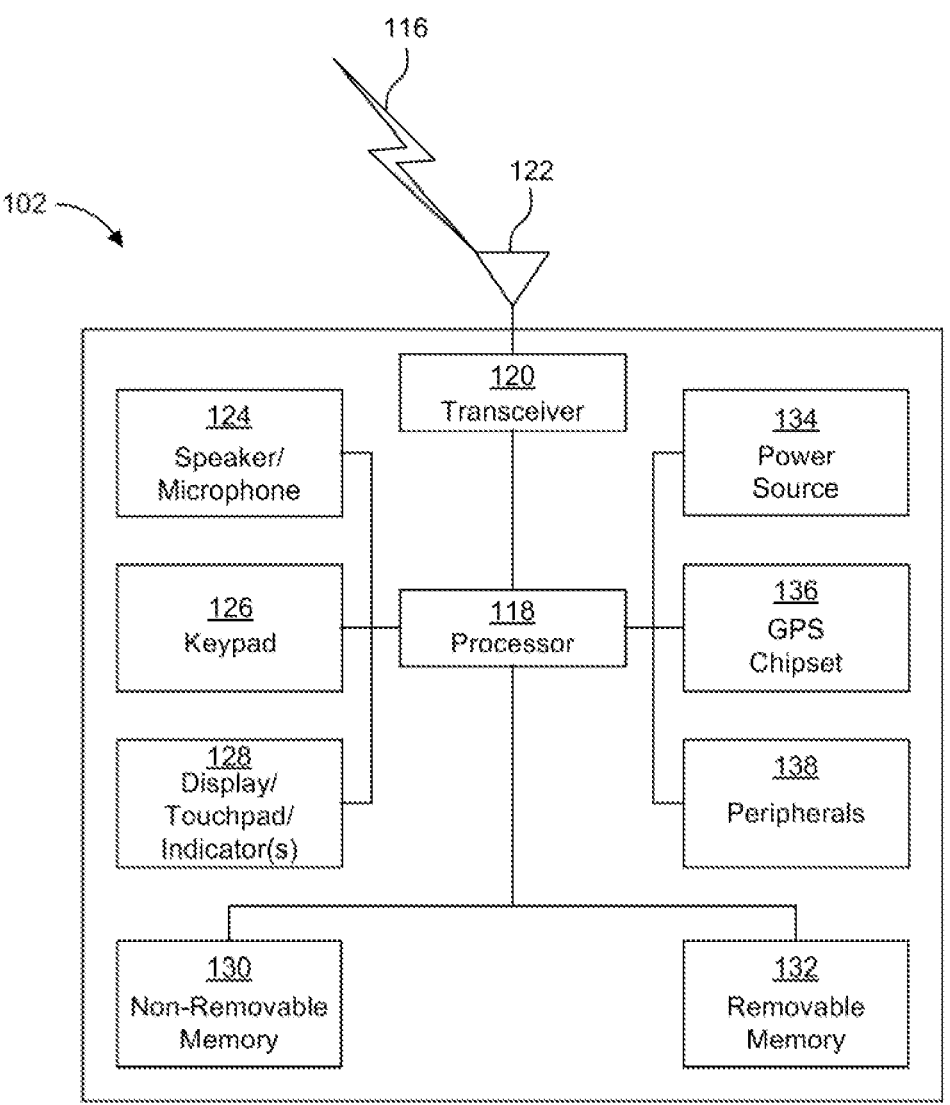
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs), any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors. The sensors may be one or more of a gyroscope, an accelerometer, a hall effect sensor, a magnetometer, an orientation sensor, a proximity sensor, a temperature sensor, a time sensor; a geolocation sensor, an altimeter, a light sensor, a touch sensor, a magnetometer, a barometer, a gesture sensor, a biometric sensor, a humidity sensor and the like.

The WTRU 102 may include a full duplex radio for which transmission and reception of some or all of the signals (e.g., associated with particular subframes for both the UL (e.g., for transmission) and DL (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the DL (e.g., for reception)).

Figure 1C:
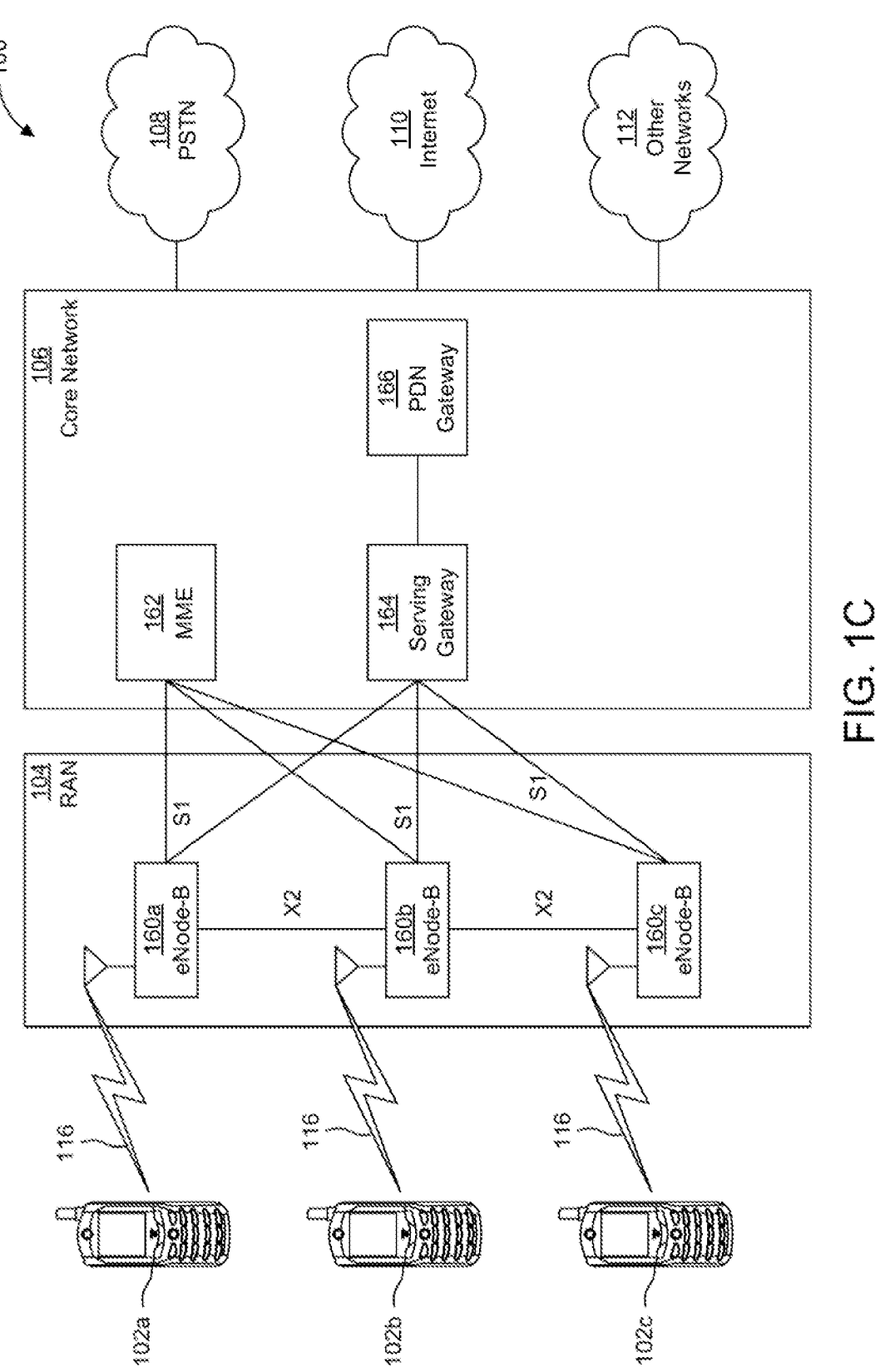
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (PGW) 166. While the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz, and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode) transmitting to the AP, all available frequency bands may be considered busy even though a majority of the available frequency bands remains idle.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
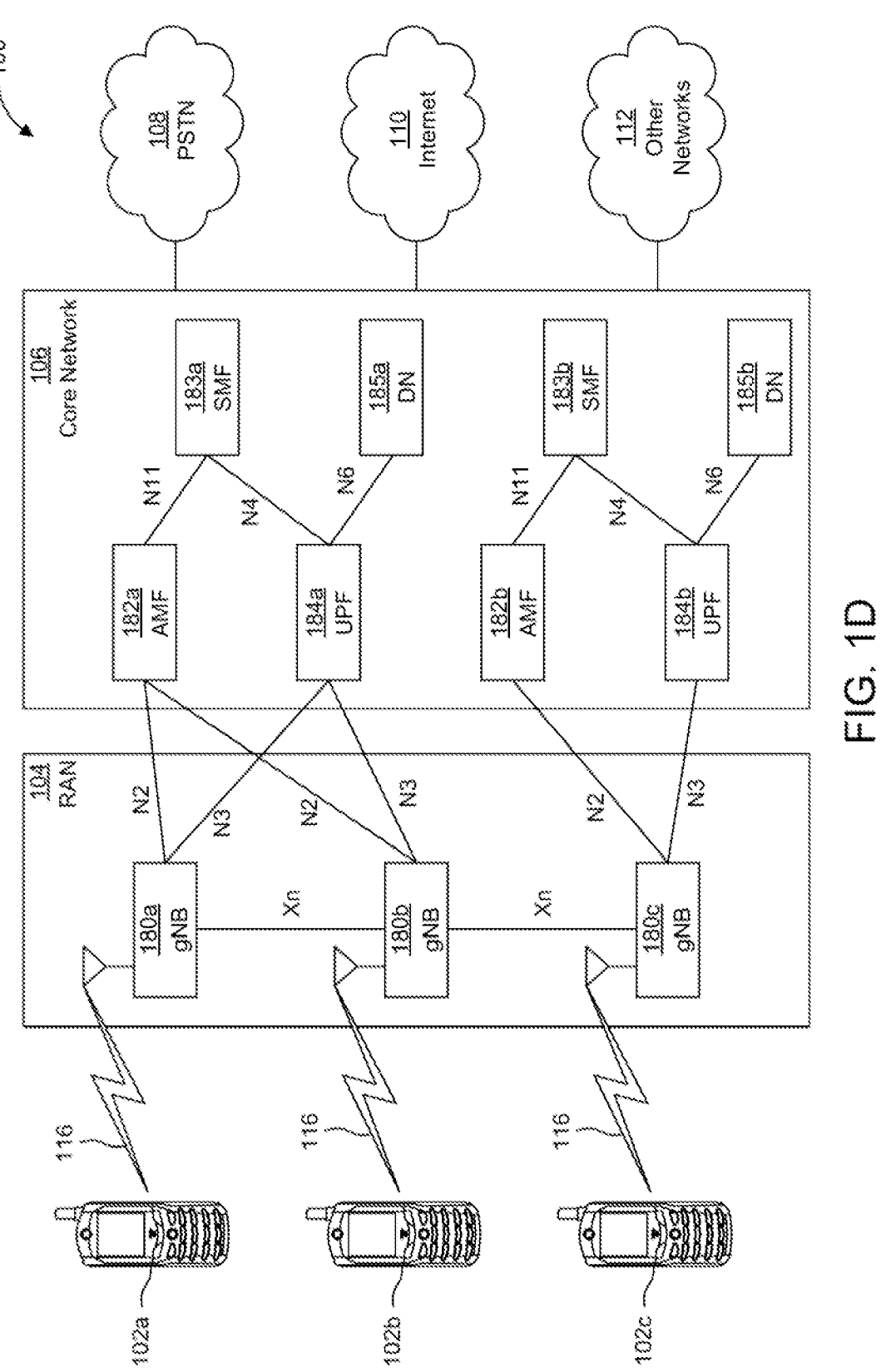
FIG. 1D is a system diagram illustrating a further example RAN and a further example CN that may be used within the communications system illustrated in FIG. 1A according to an embodiment.

FIG. 1D is a system diagram illustrating the RAN 104 and the CN 106 according to an embodiment. As noted above, the RAN 104 may employ an NR radio technology to communicate with the WTRUs 102a, 102b, 102c over the air interface 116. The RAN 104 may also be in communication with the CN 106.

The RAN 104 may include gNBs 180a, 180b, 180c, though it will be appreciated that the RAN 104 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing a varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, DC, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 106 shown in FIG. 1D may include at least one AMF 182a, 182b, at least one UPF 184a,184b, at least one Session Management Function (SMF) 183a, 183b, and possibly a Data Network (DN) 185a, 185b. While the foregoing elements are depicted as part of the CN 106, it will be appreciated that any of these elements may be owned and/or operated by an entity other than the CN operator.

The AMF 182a, 182b may be connected to one or more of the gNBs 180a, 180b, 180c in the RAN 104 via an N2 interface and may serve as a control node. For example, the AMF 182a, 182b may be responsible for authenticating users of the WTRUs 102a, 102b, 102c, support for network slicing (e.g., handling of different protocol data unit (PDU) sessions with different requirements), selecting a particular SMF 183a, 183b, management of the registration area, termination of non-access stratum (NAS) signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for MTC access, and the like. The AMF 182a, 182b may provide a control plane function for switching between the RAN 104 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 106 via an N11 interface. The SMF 183a, 183b may also be connected to a UPF 184a, 184b in the CN 106 via an N4 interface. The SMF 183a, 183b may select and control the UPF 184a, 184b and configure the routing of traffic through the UPF 184a, 184b. The SMF 183a, 183b may perform other functions, such as managing and allocating WTRU IP address, managing PDU sessions, controlling policy enforcement and QoS, providing DL data notifications, and the like. A PDU session type may be IP-based, non-IP based, Ethernet-based, and the like.

The UPF 184a, 184b may be connected to one or more of the gNBs 180a, 180b, 180c in the RAN 104 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering DL packets, providing mobility anchoring, and the like.

The CN 106 may facilitate communications with other networks. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local DN 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

For NR synchronization, WTRUs determine frequency and time synchronization by processing synchronization signal burst (SSB) bursts in an initial timing synchronization procedure. The initial timing synchronization procedure can be categorized with the following steps. A PSS detection occurs to identify the symbol boundary. By way of example, the symbol timing offset=The PSS peak location—sequence length with MSP and FSP being used to determine symbol timing offset. The SSB index is detected to identify the symbol offset reference to the Frame boundary. The SSB index may be determined by detecting physical broadcast channel (PBCH) de-modulation reference symbol (DMRS) sequence. The PBCH is decoded. Frame timing may be determined by a WTRU based on the knowledge of PSS symbol timing offset, SSB index location in symbols, and Half-Frame timing (0 or 5 ms, decoded from PBCH).

Figure 2:
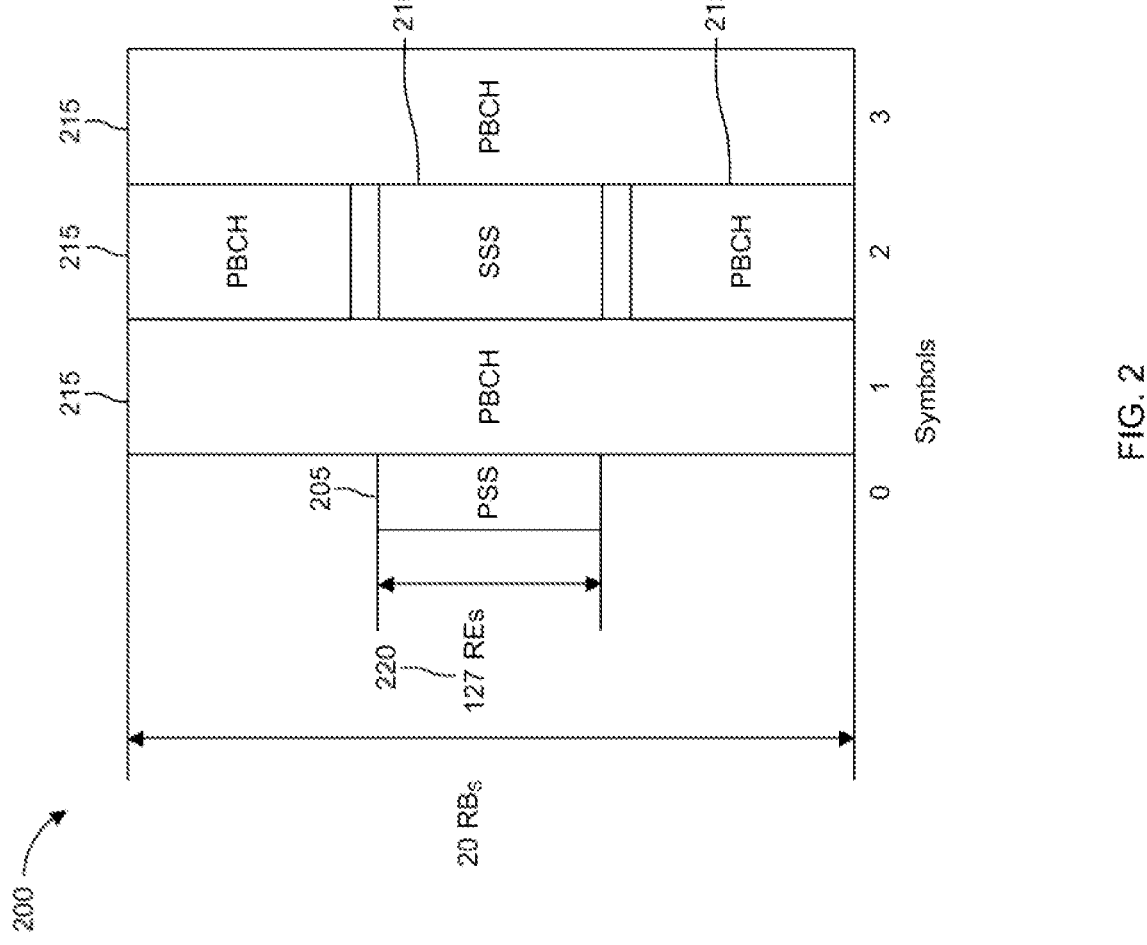
FIG. 2 illustrates the SSB structure.

FIG. 2 illustrates the SSB structure 200. As illustrated in FIG. 2A, SSB structure 200 includes 20 Resource Blocks (RBs) where each RB is 12 Resource Elements (REs) 220 over a symbol duration, also known as a single subcarrier. SSB structure 200 includes a correspondence of the primary synchronization sequence (PSS) 205, PBCH 215 and secondary synchronization sequence (SSS) 210 to RE 220 as well as distribution of OFDM symbols across PSS 205, PBCH 215 and SSS 210. SSB structure 200 includes PSS 205 in symbol 0 and SSS 210 in symbol 2 occupying the same 127 REs 220 while being located one symbol apart. FIG. 2 illustrates the PBCH 215 spread over three consecutive symbols, i.e., symbols 1, 2, and 3.

The SSB structure 200 in FIG. 2 illustrates that PSS 205 and SSS 210 sequences occupy the same 127 REs 220 and located one symbol apart. PBCH 215 is spread over three consecutive symbols. The synchronization signal (SS) burst set (the set of SS blocks within a beam sweep is referred to as an SS burst set) may be transmitted either at the beginning of the first or the second half of the frame, PBCH 215 half frame bit identifies if the detected SSB burst set is included in the first or the second half of the frame so that the WTRUs can determine full initial downlink synchronization.

Figure 3:
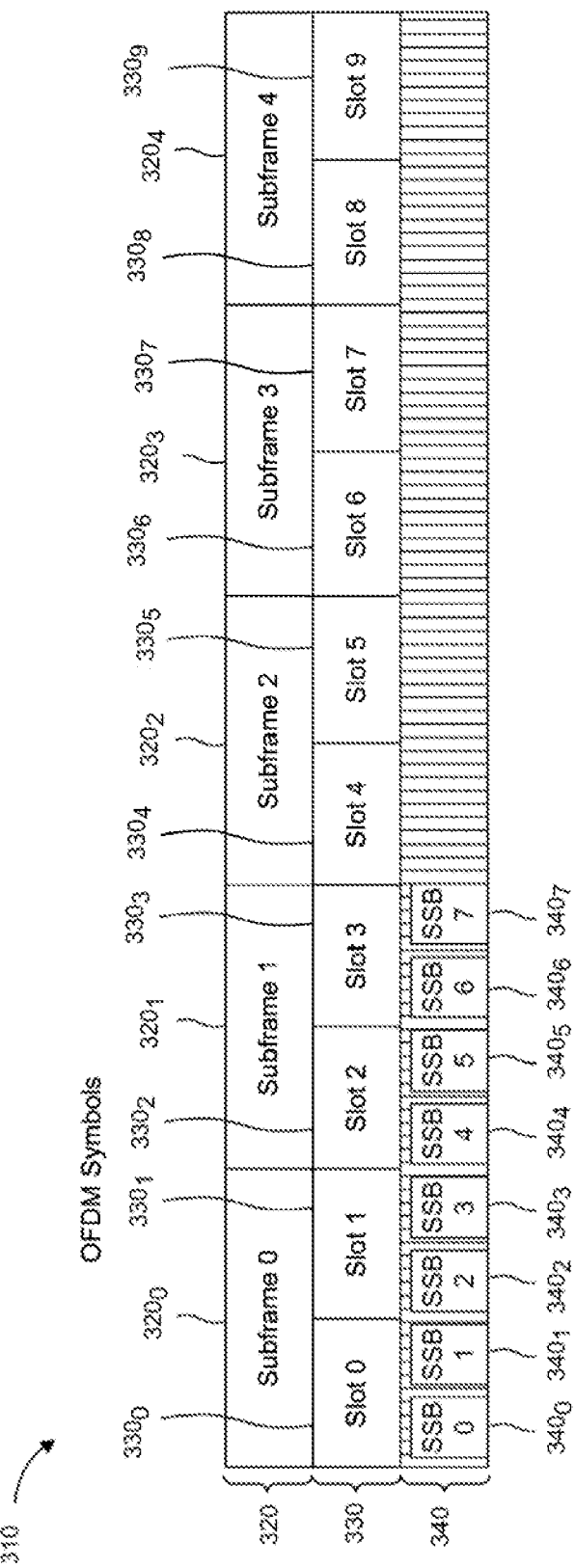
FIG. 3 illustrates the SSB index location in the time domain.

FIG. 3 illustrates the SSB index location in the time domain. SSB index location as illustrated in the example of FIG. 3 is provided for carrier frequencies between 3 GHz and 6 GHz, where Subcarrier spacing (SCS)=30 kHz. Generally, the frame may be divided in two half frames. FIG. 3 illustrates a half frame 310. Half frame 310 is divided into a number of subframes 320 including subframe 0 $320_0$, subframe 1 $320_1$, subframe 2 $320_2$, subframe 3 $320_3$, and subframe 4 $320_4$, collectively referred to as subframes 320. Each of the subframes 320 is divided into two slots 330. For example, subframe 0 $320_0$ is divided into two slots slot 0 $330_0$ and slot 1 $330_1$, subframe 1 $320_1$ is divided into two slots slot 2 $330_2$ and slot 3 $330_3$, subframe 2 $320_2$ is divided into two slots slot 4 $330_4$ and slot 5 $330_5$, subframe 3 $320_3$ is divided into two slots slot 6 $330_6$ and slot 7 $330_7$, and subframe 4 $320_4$ is divided into two slots slot 8 $330_8$ and slot 9 $330_9$, collectively referred to as slots 330. A given slot 330 may include two SSBs 340. For example, slot 0 $330_0$ includes SSB 0 $340_0$ and SSB 1 $340_1$, slot 1 $330_1$ includes SSB 2 $340_2$ and SSB 3 $340_3$, slot 2 $330_2$ includes SSB 4 $340_4$ and SSB 5 $340_5$, and slot 3 $330_3$ includes SSB 6 $340_6$ and SSB 7 $340_7$, collectively referred to as SSBs 340. SSB indices may be transmitted in predetermined symbols starting at Subframe 0 $250_0$ or Subframe 5 (not shown) to align the SSB burst transmissions in the first or the second half of the frame. The first and the fifth subframes are generally separated by 5 ms.

For example, the SSB indices may be transmitted in predetermined symbols either starting at Subframe 0 $320_0$ or Subframe 5 (not shown) to align the "SSB burst set" transmissions in the first or the second half of the frame. The first and the fifth subframes are separated by 5 ms. The SS block is transmitted periodically with a period that can be set to one of the entries among {5, 10, 20, 40, 80, and 160 ms}. WTRUs performing an initial cell search, as well as devices in inactive/idle state performing cell search for mobility, operate with the SS block being repeated at least once every 20 ms. A carrier with an SS block periodicity larger than 20 ms may not be found by devices doing initial access. However, such a carrier may utilized by devices in the connected mode, for example, as a secondary carrier in a carrier aggregation scenario.

The network guides the WTRUs after going through PSS, SSS detections, and PBCH/MIB & SIB1 decoding to determine the AbsoluteFrequencyPointA (pointer to CRB0 location in frequency domain). Once the WTRU detects the PSS, AbsoluteFrequencySSB may be derived. After decoding PBCH and reading the MIB parameter ssb-SubCarrierOffset, Kssb is determined (for frequency range (FR) 1, 4 LSB bits of Kssb value is determined by ssb-subcarrierOffset in MIB and the MSB bit is provided via a bit within the PBCH data; for FR2, the whole Kssb value can be determine via ssb-subcarrierOffset in MIB). Kssb may provide information about the frequency offset between SSB and the common resource block (CRB) grid. MIB may provide control ResourceSetZero and searchSpaceZero in Physical Downlink Control Channel (PDCCH)-ConfigSIB1 IE. The control resource set (CORESET) #0 frequency location and the time-frequency multiplexing pattern between SSB and CORESET #0/PDSCH are determined by the control ResourceSetZero parameter. The searchSpaceZero parameter may be used specify the PDCCH monitoring occasions.

```
MIB ::=                        SEQUENCE {
    systemFrameNumber              BIT STRING (SIZE (6)),
    subCarrierSpacingCommon        ENUMERATED
                                     {scs15or60, scs30or120},
    ssb-SubcarrierOffset           INTEGER (0..15),
    dmrs-TypeA-Position            ENUMERATED {pos2, pos3},
    pdcch-ConfigSIB1               PDCCH-ConfigSIB1,
    cellBarred                     ENUMERATED {barred,
                                     notBarred},
    intraFreqReselection           ENUMERATED {allowed,
                                     notAllowed},
    spare                          BIT STRING (SIZE (1))
}
PDCCH-ConfigSIB1 ::=           SEQUENCE {
    controlResourceSetZero         ControlResourceSetZero,
    searchSpaceZero                SearchSpaceZero
}
```

Figure 4:
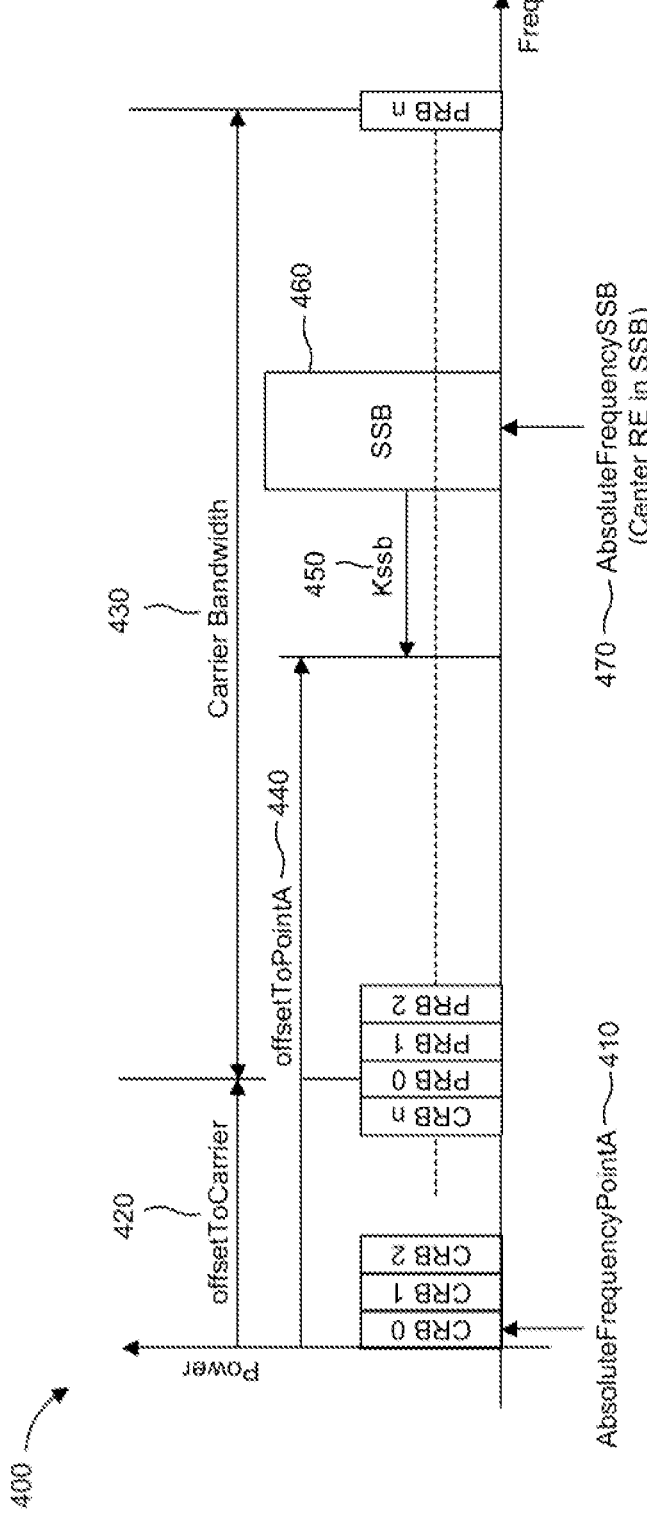
FIG. 4 illustrates a cell defining frequency allocation.

FIG. 4 illustrates a cell defining frequency allocation 400. Cell defining frequency allocation 400 include an Absolute-FrequencyPointA 410 from which the plot of cell defining frequency allocation 400 increases with frequency and power. The offsetToCarrier 420 and carrier bandwidth 430 define the frequency allocation 400. Common resource blocks (CRB) may begin at AbsoluteFrequencyPointA 410 in increasing increments until CRB, that is included in the offsetToCarrier 420 with physical resources blocks (PRB) increase in increments until the end of the frequency allocation 400. An offsetToPointA 440 is provided from AbsoluteFrequencyPointA 410. From offsetToPointA 440 using Kssb 450, the SSB 460 may be located at an Absolute-FrequnecySSB 470 in reference to the center RE within the SSB.

After decoding Type0-PDCCH for SIB1, the WTRU may extract the SIB1 parameter "offsetToPointA" 440 as indicated in FIG. 4. The presence of Type0-PDCCH for SIB1 may be determined. The parameter that controls if an SSB may be considered cell defining (i.e., SIB1 parameters can be extracted for initial access) in MIB is "Kssb" 450 which points to the frequency domain offset between SSB and the common resource block grid in number of subcarriers (SCS=15 kHz). This field may indicate that the cell does not provide SIB1 and that there is no CORESET #0 configured in MIB.

After decoding the MIB, the WTRUs may decode SIB1 parameters:

If Kssb≤23 for FR1 or Kssb≤11 for FR2, then SIB1 is transmitted in the same initial BWP where the SSB is detected;

If 24≤Kssb≤29 for FR1 or 12≤Kssb≤13 for FR2, then no SIB1 info exists;

Find the SSB raster that has SIB1 info;

Target SSB raster position;

N_global synchronization channel number (GSCN) ^Reference (1+N_GSCN^Offset);

Kssb=30 for FR1 and Kssb=14 for FR2 are reserved;

If Kssb=31 for FR1 or Kssb=15 for FR2, no SSB having an associated Type0-PDCCH CSS set within a GSCN range [N_GSCN^Reference-N_GSCN^Start,N_G-SCN^Reference+N_GSCN^End].

The subcarrier spacing used above may be 15 kHz for FR1 and 60 kHz for FR2 regardless of SSB subcarrier spacing. The maximum offset between a non-cell defining SSB and the cell defining SSB may be in the largest at Kssb=26 and 29 for FR1 as indicated in TABLE 1 below and at Kssb=12 and 13 for FR2 as indicated in TABLE 2 below. The corresponding maximum offset corresponds to ±11.52 MHz for FR1 and ±15.36 MHz for FR2 between non-cell defining SSB and the cell defining SSB.

TABLE 1

Mapping between Kssb (subcarrier offset), PDCCH-ConfigSIB1 (determining BW for PDCCH/SIB) for FR1

| $k_{SSB}$ | 16 × controlResourceSetZero + searchSpaceZero | $N_{GSCN}{}^{Offset}$ |
|---|---|---|
| 24 | 0, 1, . . . , 255 | 1, 2, . . . , 256 |
| 25 | 0, 1, . . . , 255 | 257, 258, . . . , 512 |
| 26 | 0, 1, . . . , 255 | 513, 514, . . . , 768 |
| 27 | 0, 1, . . . , 255 | −1, −2, . . . , −256 |
| 28 | 0, 1, . . . , 255 | −257, −258, . . . , −512 |
| 29 | 0, 1, . . . , 255 | −513, −514, . . . , −768 |
| 30 | 0, 1, . . . , 255 | Reserved, Reserved, . . . , Reserved |

TABLE 2

Mapping between Kssb and PDCCH-ConfiguSIB1 for FR2

| $k_{SSB}$ | 16 × controlResourceSetZero + searchSpaceZero | $N_{GSCN}{}^{Offset}$ |
|---|---|---|
| 12 | 0, 1, . . . , 255 | 1, 2, . . . , 256 |
| 13 | 0, 1, . . . , 255 | −1, −2, . . . , −256 |
| 14 | 0, 1, . . . , 255 | Reserved, Reserved, . . . , Reserved |

Figure 5:
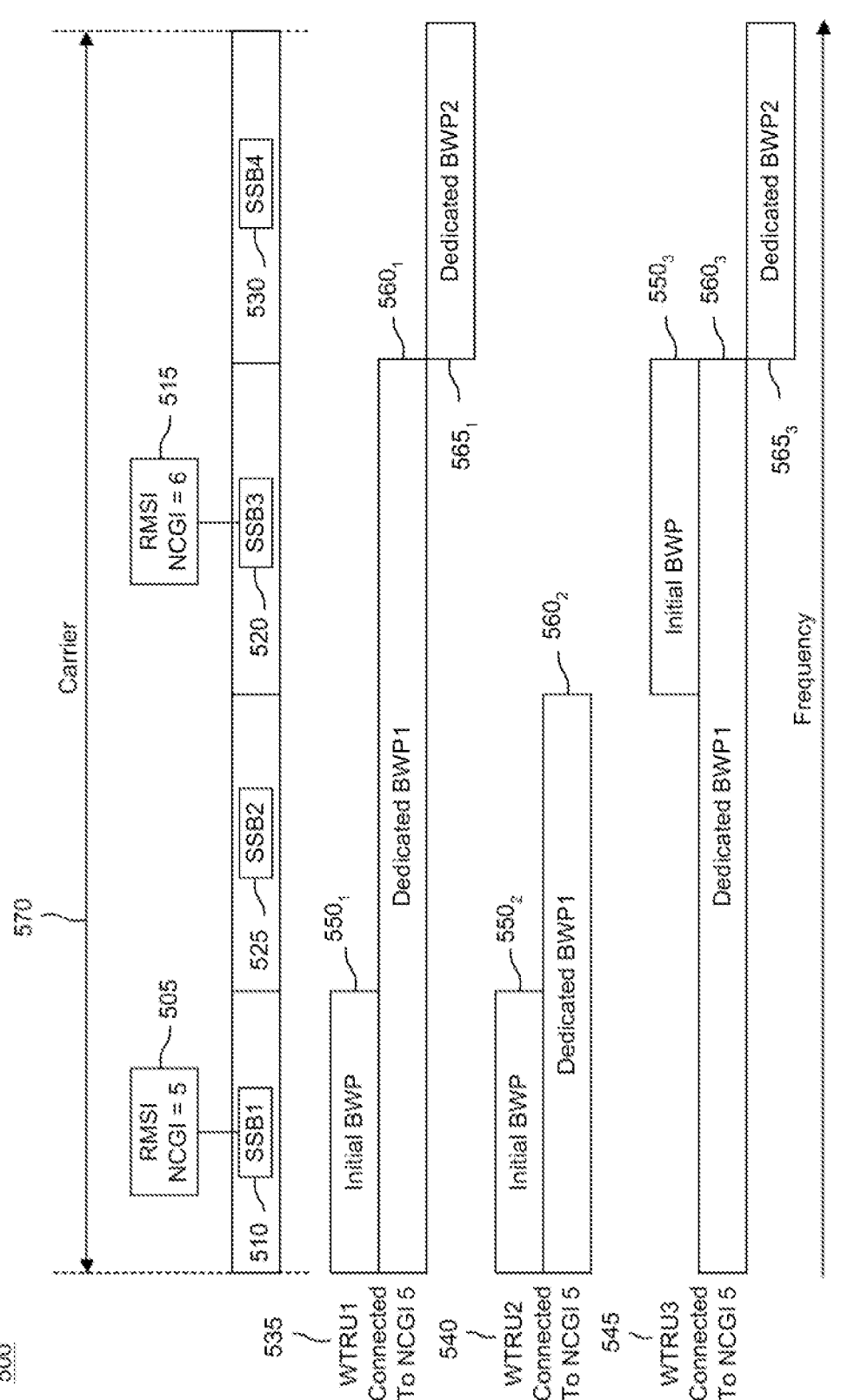
FIG. 5 illustrates a depiction of multiple SSBs in a carrier.

FIG. 5 illustrates a depiction 500 of multiple SSBs in a carrier. Specifically, FIG. 5 illustrates frequency domain (increasing moving to the right in depiction 500) placement of multiple SSBs 510, 520, 525, 530 within the carrier 570. For a WTRU in a Radio Resource Control (RRC)_CON-NECTED state, the BWPs $550_1$, $560_1$, $565_1$ as configured by a serving cell may overlap in the frequency domain with the BWPs $550_3$, $560_3$, $565_3$ configured for other WTRUs for other cells within a carrier. BWPs $550_1$, $560_1$, $565_1$ of WRTU 1 and BWPs $550_2$, $560_2$ of WRTU 2 are BWPs of different WTRUs within the same cell, i.e., Cell 5 with NR Cell Global Identifier (NCGI)=5. Multiple SSBs may also be transmitted within the frequency span of a carrier used by the serving cell. From the WTRU perspective each serving cell is associated with at most a single SSB.

FIG. 5 illustrates a scenario in which there are multiple SSBs 510, 520, 525, 530 within a carrier 570, identifying two different cells 505, 515 (NCGI=5 505 (to be termed Cell 5) associated to SSB1 510, and NCGI=6 515 (to be termed Cell 6) associated to SSB3 520). Overlapping BWPs of Cell 5 550$_1$, 560$_1$, 565$_1$; 550$_2$, 560$_2$, and BWPs of Cell 6 550$_3$, 560$_3$, 565$_3$ are illustrated. RRM measurements may be performed by the WTRU on each of the available SSBs 510, 520, 525, 530, i.e., SSB1 510, SSB2 525, SSB3 520 and SSB4 530. There is a single cell defining SSB per cell, e.g., SSB1 510 for Cell 5 505 and SSB3 520 for Cell 6 515. The Cell defining SSB can be in the initial BWP 550$_1$, 550$_2$ for Cell 5 and 550$_3$ for Cell 6. Each cell has only one initial BWP: 550$_1$ (configured to WTRU 1) and (configured to WTRU 2) 550$_2$ is the initial BWP for Cell 5, and 550$_3$ (configured to WTRU 3) is the initial BWP for Cell 6. Two different initial BWP IDs 550$_1$ and 550$_2$ in FIG. 5 are illustrated from WTRU perspective, while they are the same initial BWP from the cell perspective. Cell defining SSB is defined by the association with RMSI. Therefore, SSB1 510 and SSB3 520 are the cell-defining SSBs. Initial BWP is used for initial access. On the other hand, 560$_1$, 565$_1$ (configured to WTRU 1 from Cell 5), 560$_2$ (configured to WTRU 2 from Cell 5), 560$_3$, 565$_3$ (configured to WTRU 3 from Cell 6) are dedicated BWPs used for data transmission. Dedicated BWPs may be configured to a WTRU 535, 540, 545 after successful initial access via the initial BWP.

Figure 6:
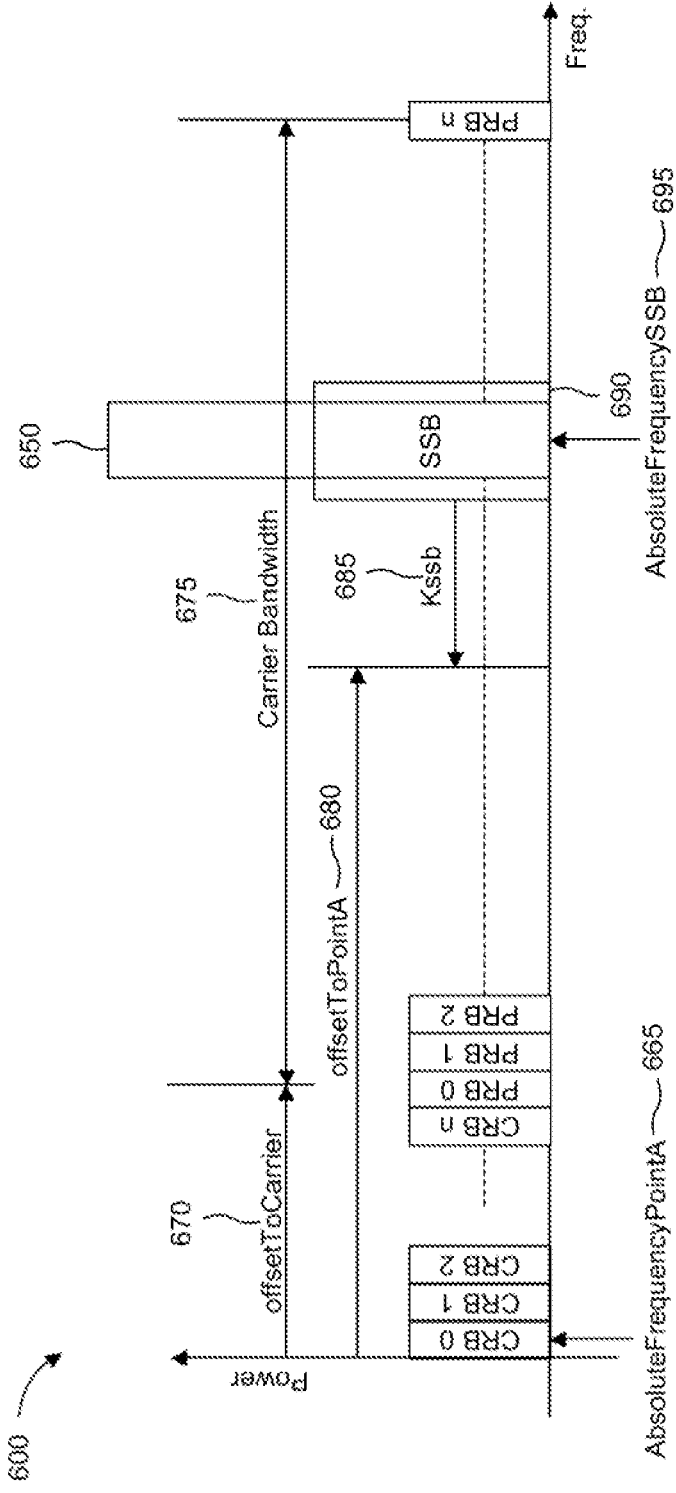
FIG. 6 illustrates an example in which a narrow band interferer is overlapping with an SSB block.

FIG. 6 illustrates an example 600 in which a narrow band interferer 650 is overlapping with an SSB block 690. Similar to the cell defining frequency allocation of FIG. 4, example 600 includes a cell defining frequency allocation includes an AbsoluteFrequencyPointA 665 from which the plot of cell defining frequency allocation increases with frequency and power. The offsetToCarrier 670 and carrier bandwidth 675 define the frequency allocation. Common resource blocks (CRB) may begin at AbsoluteFrequencyPointA 665 in increasing increments until CRB, that is included in the offsetToCarrier 670 with physical resources blocks (PRB) increase in increments until the end of the frequency allocation. An offsetToPointA 680 is provided from AbsoluteFrequencyPointA 665. From offsetToPointA 680 using Kssb 685, the SSB 690 may be located at an Absolute-FrequnecySSB 695 in reference to the center RE within the SSB. In this example 600, there is an interferer 650 that interferes with the SSB 690. This interferer 650 is illustrated as being roughly centered on SSB 690, although as would be understood, this is only an example configuration as interference may occur with misalignments as well. Interferer 650 may be a narrowband high-power interferer such as RADAR. Interferer may be overlapping in some way (interfering) with cell defining SSB 690 block in frequency domain. Systems, apparatus and methods are disclosed herein by which a network dynamically reconfigures to mitigate the adverse effects that can occur in a scenario like this, thereby facilitating coexistence of advanced networks such as 5G NR and narrowband interferers such as RADAR.

FIG. 6 depicts a narrowband high-power interferer 650 such as RADAR overlapping with cell defining SSB block 690 in frequency domain. In a cellular deployment scenario, the WTRUs either emerging in the coverage area or already camped on the cell may experience destructive impact due to narrowband high-power interferers 650 such as RADAR as captured in FIG. 6. It is imperative that the presence and characteristics of RADAR interference are identified before cellular system starts suffering.

Robust SSB reception in the presence of narrowband high-power interferers, such as RADAR, may be achieved by utilizing multiple cell defining SSB transmission based RADAR avoidance and/or SSB interference coordination using time-frequency interleaved cell defining SSBs. Multiple cell defining SSB transmission may mitigate high power narrowband interferers by allocating two or more cell defining SSBs separated in the frequency domain. The allocated cell defining SSBs may be interleaved in the time domain. If one SSB is corrupted by the high-power narrowband interferer, one or more remaining SSBs may not be affected. "Orthogonal" time-frequency interleaving patterns may be applied on a set of coordinating neighboring cells to minimize the inter-cell SSB interference, while maintaining the robustness of SSB reception in the presence of narrowband high-power interferers such as Radar.

In the example of multiple cell defining SSB transmission based RADAR avoidance, it is understood that the cell defining SSB is important for the emerging WTRUs to access to the network as well as for already existing WTRUs in the network to monitor and extract the SI information updates and related paging messages. Having only one cell defining SSB may cause total system failure for both the emerging and already camped WTRUs if a high-power narrow band interferer, such as RADAR, overlaps in time and frequency domains with the SSB transmissions.

Figure 7:
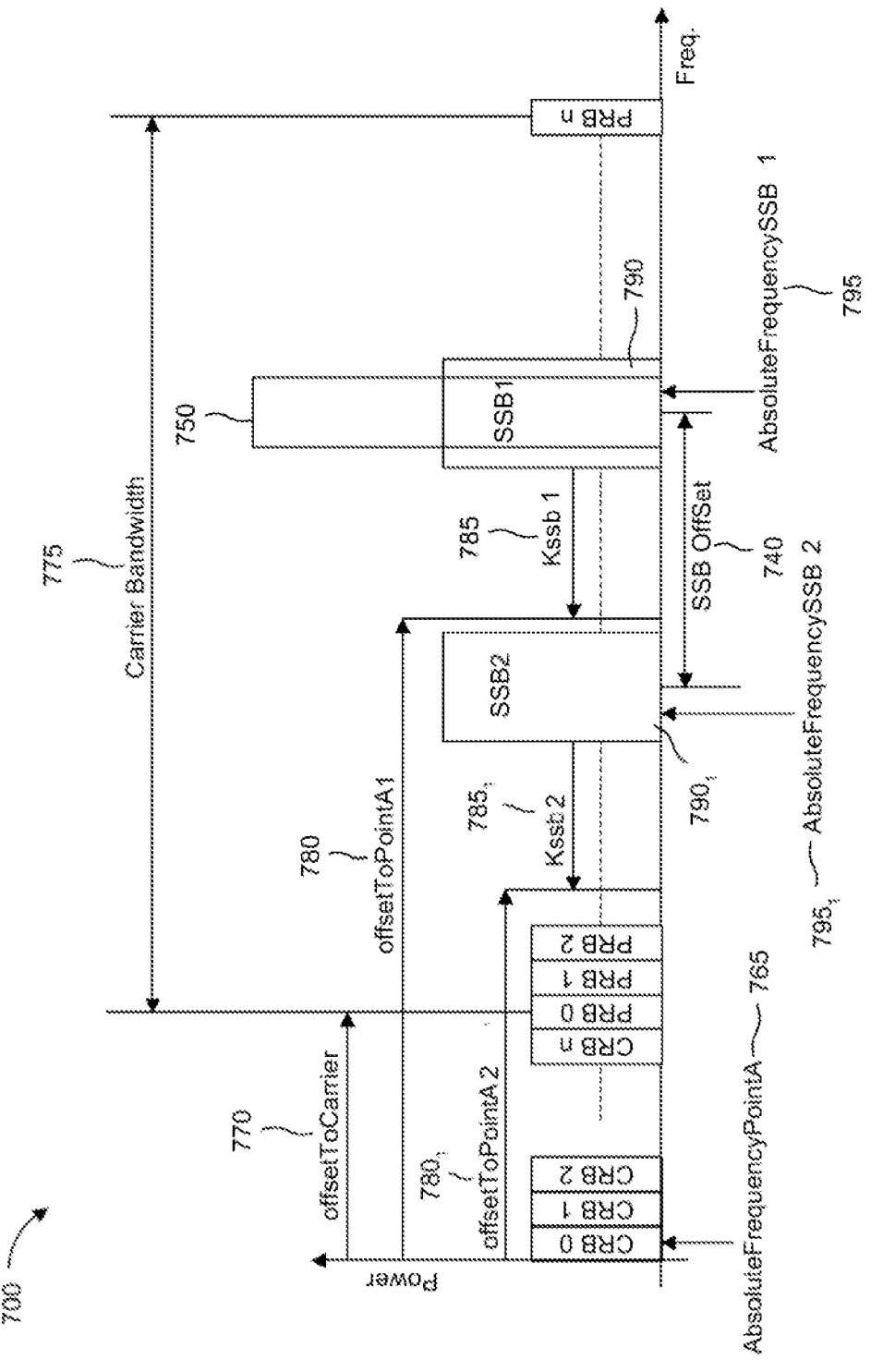
FIG. 7 illustrates a technique for moving an SSB location in a negative direction to mitigate interference.

FIG. 7 illustrates a technique utilizing multiple cell defining SSBs to mitigate interference. While FIG. 7 depicts utilizing two cell defining SSBs to mitigate the interference, the present description contemplates the use of any number of the SSBs to mitigate the interference and the use of two SSBs is only an example.

FIG. 7 illustrates an example 700 in which a narrow band interferer 750 is overlapping with an SSB block 790. Similar to the cell defining frequency allocation of FIG. 6, example 700 includes a cell defining frequency allocation includes an AbsoluteFrequencyPointA 765 from which the plot of cell defining frequency allocation increases with frequency and power. The offsetToCarrier 770 and carrier bandwidth 775 define the frequency allocation. Common resource blocks (CRB) may begin at AbsoluteFrequencyPointA 765 in increasing increments until CRB, that is included in the offsetToCarrier 770 with physical resources blocks (PRB) increase in increments until the end of the frequency allocation. An offsetToPointA 780 is provided from AbsoluteFrequencyPointA 765. From offsetToPointA1 780 using Kssb1 785, the SSB1 790 may be located at an Absolute-FrequnecySSB1 795 in reference to the center RE within the SSB. In this example 700, there is an interferer 750 that interferes with the SSB1 790. This interferer 750 is illustrated as being roughly centered on SSB1 790, although as would be understood, this is only an example configuration as interference may occur with misalignments as well. As described with respect to interferer 650 of FIG. 6, interferer 750 may be a narrowband high-power interferer such as RADAR. Interferer may be overlapping in some way (interfering) with cell defining SSB1 790 block in frequency domain.

As illustrated in FIG. 7, systems, apparatus and methods are disclosed herein by which a network dynamically reconfigures to mitigate the adverse effects that can occur in a scenario like this, thereby facilitating coexistence of advanced networks such as 5G NR and narrowband interferers such as RADAR. An additional offsetToPointA2 780$_1$ and an SSB2 790$_1$ located at AbsoluteFrequencySSB2 795$_1$ using Kssb2 785$_1$. As is illustrated in FIG. 7, SSB2 790$_1$ is shifted using SSB Offset 740 from SSB1 790, and therefore also from interferer 750 in the example, to be able mitigate interference with interferer 750. In anticipation of an interferer, an additional cell defining SSB frequency location is added to be able mitigate narrowband interference when the interference level triggers the event that the threshold passing detected. Once the interferer 750 presence over SSB1 790 is detected, the network may utilize the additional cell defining SSB2 790₁ that is in the carrier spectrum with a location designed so interference with SSB1 790 would not interfere also with the SSB block processing for the emerging WTRUs for synchronization and initial access procedures, such as PSS, SSS detection, extracting MIB and SIB1 parameters, and performing RACH procedures. The WTRUs already camped on the cell may perform RACH procedures, if needed, and decode paging messages by using the SSB2 790₁. Similarly, if the interferer presence over SSB2 790₁ is detected, WTRUs may utilize cell defining SSB1 790 for synchronization and initial access procedures.

As depicted in FIG. 7, the simultaneous two cell defining SSBs (SSB1 790, SSB2 790₁) mitigate the impact of interand SIB1 reading, it can extract the cell defining SSB2 absolute frequency location (indicated as absoluteFrequencySSB2 795₁ in FIG. 7) in the resource grid from absolute-FrequencyOtherSSBs. Similarly, if a WTRU detects the EQC2 790 first and goes through the related MIB and SIB1 parameter extraction, this WTRU is aware of the SIB1 location in the resource grid (indicated as absoluteFrequencySSB1 795 in FIG. 7) by reading the absoluteFrequency-OtherSSBs given in the SIB of ndt2 790. In addition, the absolute frequency location of the "target" cell defining SSB can be indicated in the FrequencyInfoDL-SIB IE using another new field "absoluteFrequencySSB". In addition, each CD-SSB can be associated with a cell defining SSB index, as exemplified by the parameters indexCdSSB and indexOtherCdSSBs in the FrequencyInfoDL-SIB IE.

```
FrequencyInfoDL-SIB ::=              SEQUENCE {
    frequencyBandList               MultiFrequencyBandListNR-SIB,
    offsetToPointA                  INTEGER (0..2199),
    scs-SpecificCarrierList         SEQUENCE (SIZE (1..maxSCSs)) OF SCS-SpecificCarrier
        absoluteFrequencySSB            ARFCN-ValueNR
        absoluteFrequencyOtherSSBs      SEQUENCE (SIZE (1..maxCellDefiningSSBs−1)) OF ARFCN-
ValueNR  indexCdSSB                      INTEGER (0..
maxCellDefiningSSBs−1),
        indexOtherCdSSBs                SEQUENCE (SIZE (1..maxCellDefiningSSBs−
1)) OF INTEGER (0..maxCellDefiningSSBs−1),
}
maxCellDefiningSSBs                 INTEGER ::= 4
DownlinkConfigCommonSIB ::=         SEQUENCE {
    frequencyInfoDL             FrequencyInfoDL-SIB,
    initialDownlinkBWP              BWP-DownlinkCommon,
    bcch-Config                     BCCH-Config,
    pcch-Config                     PCCH-Config,
    ...
}
ServingCellConfigCommonSIB ::=              SEQUENCE {
    downlinkConfigCommon                    DownlinkConfigCommonSIB,
    uplinkConfigCommon                      UplinkConfigCommonSIB          OPTIONAL, -- Need R
    supplementaryUplink                     UplinkConfigCommonSIB          OPTIONAL, -- Need R
    n-TimingAdvanceOffset                   ENUMERATED { n0, n25600, n39936 }    OPTIONAL, -- Need S
    ssb-PositionsInBurst                SEQUENCE {
        inOneGroup                      BIT STRING (SIZE (8)),
        groupPresence                   BIT STRING (SIZE (8))              OPTIONAL -- Cond FR2-Only
    },
    ssb-PeriodicityServingCell              ENUMERATED {ms5, ms10, ms20, ms40, ms80, ms160},
    tdd-UL-DL-ConfigurationCommon               TDD-UL-DL-ConfigCommon             OPTIONAL, -- Cond
TDD
    ss-PBCH-BlockPower              INTEGER (−60..50),
    ...,
}
``` ferer 750. As set forth above, the system design may include more than two simultaneous cell defining SSBs in various frequency locations to enhance initial access for the emerging WTRUs and connectivity for the existing WTRUs in the network. The deployed number of simultaneous cell defining SSBs is subject to the constraint of carrier bandwidth and the consideration of robustness vs overhead tradeoff. Larger carrier bandwidth may accommodate a higher number simultaneous cell defining SSBs. Once an emerging WTRU detects and decodes one of the cell defining SSBs from SIB1, the WTRU can extract all necessary information relevant to other cell defining SSB synchronization raster location(s). The emerging WTRU can then read MIB and SIB1 system information associated with all the cell defining SSBs.

To this end, a new field absoluteFrequencyOtherSSBs can be added to the FrequencyInfoDL-SIB IE in SIB1 to provide the synchronization raster location(s) of other cell defining SSB(s) within the same cell. If the emerging WTRU gets into the system via SSB1 detection, and SSB1 related MIB When multiple cell defining SSBs are configured, there will be one CORESET #0 and one search space set 0 per cell defining SSBs, as defined in each associated MIB. In particular, the ssb-SubcarrierOffset and the contents of control ResourceSetZero and searchSpaceZero in the MIB PDCCH-ConfigSIB1 IE are defined specific to each cell defining SSB. In addition, the spare bit in the MIB can be used to indicate the presence of multiple cell defining SSBs (to be termed multipleCellDefiningSSBs).

```
MIB ::=                     SEQUENCE {
    systemFrameNumber               BIT STRING (SIZE (6)),
    subCarrierSpacingCommon             ENUMERATED
                                        {scs15or60, scs30or120},
    ssb-SubcarrierOffset            INTEGER (0..15),
    dmrs-TypeA-Position             ENUMERATED {pos2, pos3},
    pdcch-ConfigSIB1                PDCCH-ConfigSIB1,
    cellBarred                      ENUMERATED {barred,
                                    notBarred},
    intraFreqReselection            ENUMERATED {allowed,
                                    notAllowed},
```

-continued

| multipleCellDefiningSSBs | BIT STRING (SIZE (1)) |
| --- | --- |
| } | |
| PDCCH-ConfigSIB1 ::= | SEQUENCE { |
| controlResourceSetZero | ControlResourceSetZero, |
| searchSpaceZero | SearchSpaceZero |
| } | |

Furthermore, the BWP-DownlinkCommon IE may contain a new multiSSBGenericParameters IE which defines the locationAndBandwidth associated with the multiple simultaneous SSB configuration. WTRUs that cannot support multiple cell-defining SSBs may use the locationAndBandwidth in the genericParameters IE.

```
BWP ::=                              SEQUENCE {
    locationAndBandwidth                 INTEGER (0..37949),
    subcarrierSpacing                    SubcarrierSpacing,
    cyclicPrefix                         ENUMERATED { extended }
}
BWP-DownlinkCommon ::=                   SEQUENCE {
    genericParameters                BWP,
    multiSSBGenericParameters            BWP,
    pdcch-ConfigCommon                   SetupRelease { PDCCH-ConfigCommon }
    pdsch-ConfigCommon                   SetupRelease { PDSCH-ConfigCommon }
    ...
}
BWP-UplinkCommon ::=                     SEQUENCE {
    genericParameters                BWP,
    rach-ConfigCommon                    SetupRelease { RACH-ConfigCommon }
    pusch-ConfigCommon                   SetupRelease { PUSCH-ConfigCommon }
    pucch-ConfigCommon                   SetupRelease { PUCCH-ConfigCommon }
    ...,
}
DownlinkConfigCommonSIB ::=              SEQUENCE {
    frequencyInfoDL                  FrequencyInfoDL-SIB,
    initialDownlinkBWP                   BWP-DownlinkCommon,
    bcch-Config                      BCCH-Config,
    pcch-Config                      PCCH-Config,
    ...
}
UplinkConfigCommonSIB ::=                SEQUENCE {
    frequencyInfoUL                      FrequencyInfoUL-SIB,
    initialUplinkBWP                 BWP-UplinkCommon,
    timeAlignmentTimerCommon             TimeAlignmentTimer
}
ServingCellConfigCommonSIB ::=           SEQUENCE {
    downlinkConfigCommon                 DownlinkConfigCommonSIB,
    uplinkConfigCommon                   UplinkConfigCommonSIB
    supplementaryUplink                  UplinkConfigCommonSIB
}
```

Figure 8:
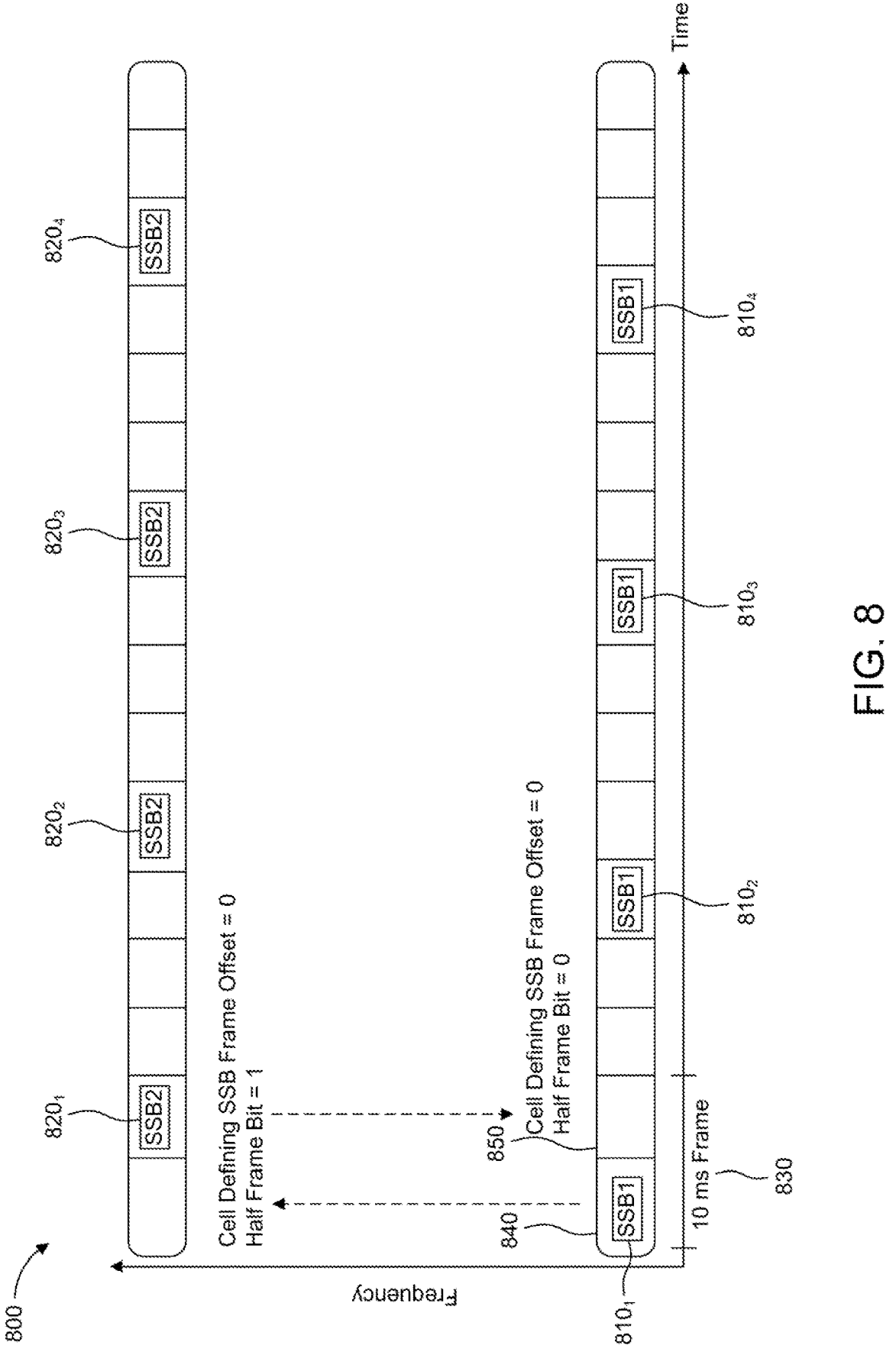
FIG. 8 illustrates a time-frequency pattern of two interleaved cell defining SSBs with one SSB operating in the first half of a frame and the other SSB operating in the second half of the frame.

FIG. 8 illustrates a time-frequency pattern 800 of two interleaved cell defining SSBs with one SSB operating in the first half of a frame and the other SSB operating in the second half of the frame. Pattern 800 includes an SSB1 810 operating in the first half 840 of a frame 830 and an SSB2 820 operating in the second half 850 of the frame 830. SSB1 810 is depicted as operating at a lower frequency than SSB2 820. Although as would be understood by those possessing an ordinary skill in the art, other configurations may also be utilized.

As is illustrated in FIG. 8, a series of frames 830 are provided in the time domain. Each of the series of frames 830 may be divided into a first half 840 of the frame 830 and a second half 850 of the frame 830. SSB1 810 may be burst in the first half 840 of each frame 830 in the series of frames 830. SSB1 810 refers to the collective of each burst in the first half 840 of frame 830 identified as SSB1 $810_1$ in the first frame, SSB1 $810_2$ in the third frame, SSB1 $810_3$ in the fifth frame, and SSB1 $810_4$ in the seventh frame. SSB2 820 refers to the collective of each burst in the second half 850 of frame 830 identified as SSB2 $820_1$ in the first frame, SSB2 $820_2$ in the third frame, SSB2 $820_3$ in the fifth frame, and SSB2 $820_4$ in the seventh frame. SSB1 810 may be defined as a cell defining SSB having a frame offset of zero identified with a half frame bit of zero. SSB2 820 may be defined as a cell defining SSB having a frame offset of zero identified with a half frame bit of one.

Figure 9:
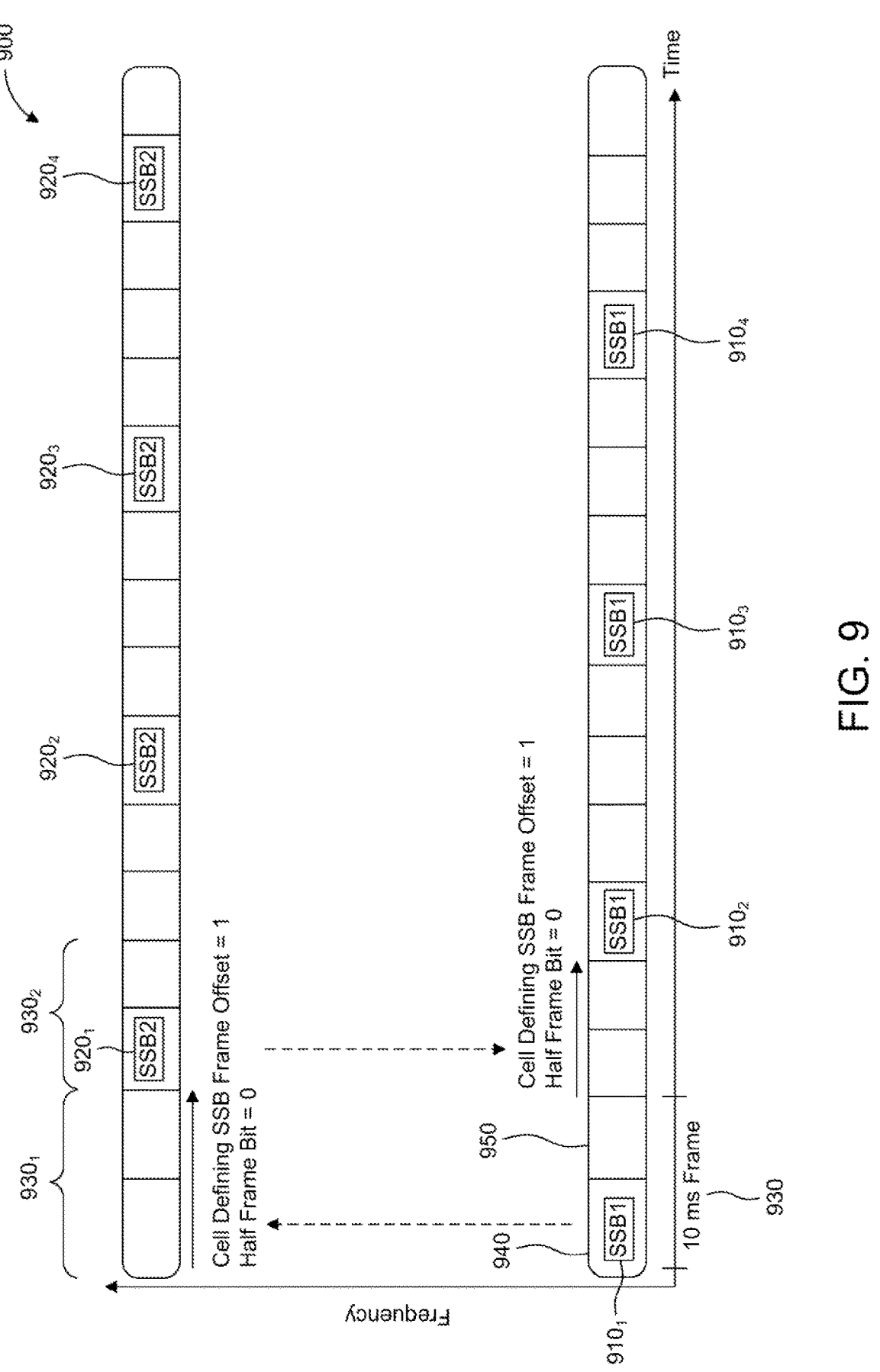
FIG. 9 illustrates a time-frequency pattern of two interleaved cell defining SSBs with one SSB operating in the first half of a first frame and the other SSB operating in the first half of the second frame.

FIG. 9 illustrates a time-frequency pattern 900 of two interleaved cell defining SSBs with one SSB operating in the first half of a first frame and the other SSB operating in the first half of the second frame. Pattern 900 includes an SSB1 910 operating in a first half 940 of a first frame $930_1$ and an SSB2 820 operating in the first half 940 of a second frame $930_2$. SSB1 910 is depicted as operating at a lower frequency than SSB2 920. Although as would be understood by those possessing an ordinary skill in the art, other configurations may also be utilized.

As is illustrated in FIG. 9, a series of frames 930 are provided in the time domain. Each of the series of frames 930 may be divided into a first half 940 of the frame 930 and a second half 950 of the frame 930. SSB1 910 may be burst in the first half 840 of a first frame $930_1$ in the series of frames 930. SSB1 910 refers to the collective of each burst in the first half 940 of the odd frames 930 starting with frame $930_1$, where the SSBs are identified as SSB1 $910_1$ in the first frame, SSB1 $910_2$ in the third frame, SSB1 $910_3$ in the fifth frame, and SSB1 $910_4$ in the seventh frame. SSB2 920 refers to the collective of each burst in the first half 940 of each of the even frames 930 starting with frame $930_2$, where the SSBs are identified as SSB2 $920_1$ in the first frame, SSB2 $920_2$ in the fourth frame, SSB2 $920_3$ in the sixth frame, and SSB2 $920_4$ in the eighth frame. SSB1 910 may be defined as a cell defining SSB having a frame offset of one identified with a half frame bit of zero. SSB2 920 may be defined as a cell defining SSB having a frame offset of one identified with a half frame bit of zero.

In additional to the frequency domain diversity afforded by the multiple cell defining SSBs, two or more cell defining SSB transmissions may be interleaved in the time domain as described for two patterns 800, 900 set forth in FIG. 8 and FIG. 9. For the case of two interleaved cell defining SSBs, such that at any given 5 ms duration, only one SS burst set is transmitting (each of the "SSB" box in the figure represents an SS burst set within a 5 ms half frame) at a given time.

Figure 10:
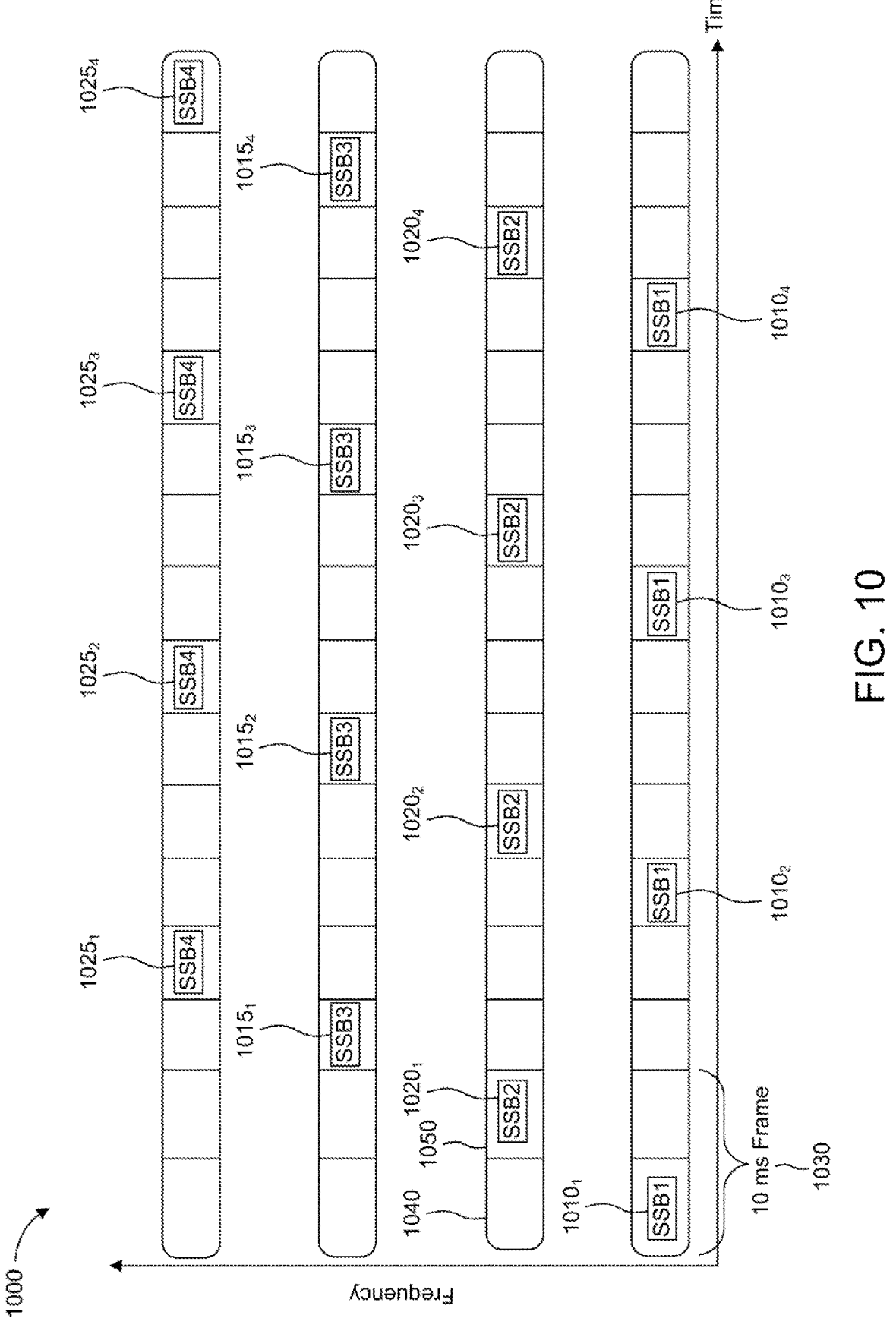
FIG. 10 illustrates a time-frequency pattern of four interleaved cell defining SSBs with one SSB operating in consecutive half frames over a period of two frames.

FIG. 10 illustrates a time-frequency pattern 1000 of four interleaved cell defining SSBs with one SSB operating in consecutive half frames over a period of two frames. Pattern 1000 includes an SSB1 1010 operating in the first half 1040 of a frame that is an odd frame in a series of frames 1030, an SSB2 1020 operating in the second half 1050 of a frame that is an odd frame in a series of frames 1030, an SSB3 1015 operating in the first half 1040 of a frame that is an even frame in a series of frames 1030, and an SSB4 1025 operating in the second half 1050 of a frame that is an even frame in a series of frames 1030. SSB1 1010 is depicted as operating at a lower frequency than SSB2 1020, SSB2 1020 lower than SSB3 1015, and SSB3 1015 lower than SSB4 1025. Although as would be understood by those possessing an ordinary skill in the art, other configurations may also be utilized.

As is illustrated in FIG. 10, a series of frames 1030 are provided in the time domain. Each of the series of frames 1030 may be divided into a first half 1040 of the frame 1030 and a second half 1050 of the frame 1030. SSB1 1010 may be burst in the first half 1040 of each odd frame in the series of frames 1030. SSB1 1010 refers to the collective of each burst in the first half 1040 of the odd frame 1030 identified as SSB1 10101 in the first frame, SSB1 1010₂ in the third frame, SSB1 1010₃ in the fifth frame, and SSB1 1010₄ in the seventh frame. SSB2 1020 refers to the collective of each burst in the second half 1050 of the odd frame 1030 identified as SSB2 1020₁ in the first frame, SSB2 1020₂ in the third frame, SSB2 1020₃ in the fifth frame, and SSB2

1020₄ in the seventh frame. SSB3 1015 refers to the collective of each burst in the first half 1040 of the even frame 1030 identified as SSB3 10151 in the second frame, SSB3 1015₂ in the fourth frame, SSB3 1015₃ in the sixth frame, and SSB3 1015₄ in the eighth frame. SSB4 1025 refers to the collective of each burst in the second half 1050 of the even frame 1030 identified as SSB4 1025₁ in the second frame, SSB4 1025₂ in the fourth frame, SSB4 1025₃ in the sixth frame, and SSB4 1025₄ in the eighth frame.

As set forth in FIG. 10, the system design include more than two cell defining SSBs in different time-frequency locations to guarantee initial access for the emerging WTRUs and connectivity for the existing WTRUs in the network. FIG. 10 as described above provides an example of four interleaved cell-defining SSBs. Time-frequency interleaved cell defining SSB design provide a WTRU to read the MIB and find the CORESET #0 locations of all cell defining SSBs within 20 ms.

To facilitate SSB time domain interleaving, the SIB1 may be expanded with additional fields frameOffsetOtherSSBs (with effective frame offset calculated by WTRU to be mod(frameOffsetOtherSSBs, ssb-PeriodicityServingCell/ 10)) to indicate the number of 10 ms frames relative to the current SSB and halfFrameOtherSSBs (0 indicates first half frame; 1 indicates the second half frame) to indicate locations of the half frame for the rest of the cell defining SSBs. For example, if the emerging WTRU connects via SSB1 detection, and with SSB1 related MIB and SIB1 reading, the WTRU may extract the SS burst timing offset of SSB2 relative to SSB1 from frameOffsetOtherSSBs and half-FrameOtherSSBs in addition to the SSB2 absolute frequency location in the resource grid as exemplified in FIG. 8 and FIG. 9. Similarly, if a WTRU detects the SSB2 first and connects using the related MIB and SIB1 parameter extraction, the WTRU is informed of the other cell defining SSB time-frequency locations in the resource grid. A configuration may be provided where time domain interleaving may be disabled by setting frameOffsetOtherSSBs to zero and halfFrameOtherSSBs to the same value as the PBCH half frame bit of each associated SSB.

```
FrequencyInfoDL-SIB ::=                  SEQUENCE {
    frequencyBandList                    MultiFrequencyBandListNR-SIB,
    offsetToPointA                       INTEGER (0..2199),
    scs-SpecificCarrierList              SEQUENCE (SIZE (1..maxSCSs)) OF SCS-SpecificCarrier
        absoluteFrequencySSB                     ARFCN-ValueNR
        absoluteFrequencyOtherSSBs               SEQUENCE (SIZE (1..maxCellDefiningSSBs–1)) OF ARFCN-
ValueNR
        frameOffsetOtherSSBs                     SEQUENCE (SIZE (1..maxCellDefiningSSBs–1)) OF INTEGER (0..15)
        halfFrameOtherSSBs                       BIT STRING (SIZE (maxCellDefiningSSBs–1))
}
DownlinkConfigCommonSIB ::=              SEQUENCE {
    frequencyInfoDL                      FrequencyInfoDL-SIB,
    initialDownlinkBWP                       BWP-DownlinkCommon,
    bcch-Config                          BCCH-Config,
    pcch-Config                          PCCH-Config,
    ...
}
ServingCellConfigCommonSIB ::=               SEQUENCE {
    downlinkConfigCommon                     DownlinkConfigCommonSIB,
    uplinkConfigCommon                       UplinkConfigCommonSIB             OPTIONAL, -- Need R
    supplementaryUplink                      UplinkConfigCommonSIB            OPTIONAL, -- Need R
    n-TimingAdvanceOffset                    ENUMERATED { n0, n25600, n39936 }    OPTIONAL, -- Need S
    ssb-PositionsInBurst                 SEQUENCE {
        inOneGroup                       BIT STRING (SIZE (8)),
        groupPresence                        BIT STRING (SIZE (8))            OPTIONAL -- Cond FR2-Only
    },
    ssb-PeriodicityServingCell               ENUMERATED {ms5, ms10, ms20, ms40, ms80, ms160},
    tdd-UL-DL-ConfigurationCommon                TDD-UL-DL-ConfigCommon              OPTIONAL, -- Cond
TDD
```

-continued

```
ss-PBCH-BlockPower                      INTEGER (–60..50),
   ...,
}
```

After a WTRU acquires the MIB and SIB1, and retrieves the information associated with other SSBs, the WTRU can perform random access using the RACH resources associated with the SSB WTRU acquires MIB/SIB1 from (each of the cell defining SSB associated SIB1 may include a msg1-FrequencyStart in RACH-ConfigGeneric IE). Alternatively, or additionally, a WTRU may perform random access alternately using the RACH resources among all or a subset of the multiple cell defining SSBs provided in the cell (including the SSB WTRU is synchronized with and other SSBs indicated in the SIB1).

WTRU may monitor the paging occasion on different SSB/CORESET #0 for different DRX cycle, such as in an alternate fashion, for example. The WTRU may monitor multiple paging occasions from different SSB/CORESET #0s in a single DRX cycle. The network may set the same defaultPagingCycle on different cell defining SSBs.

```
PCCH-Config ::=            SEQUENCE {
    defaultPagingCycle        PagingCycle,
```

```
RACH-ConfigGeneric ::=           SEQUENCE {
    prach-ConfigurationIndex         INTEGER (0..255),
    msg1-FDM                    ENUMERATED {one, two, four, eight},
    msg1-FrequencyStart             INTEGER (0..maxNrofPhysicalResourceBlocks–1),
    zeroCorrelationZoneConfig          INTEGER(0..15),
    preambleReceivedTargetPower         INTEGER (–202..–60),
    preambleTransMax               ENUMERATED {n3, n4, n5, n6, n7, n8, n10, n20, n50, n100, n200},
    powerRampingStep               ENUMERATED {dB0, dB2, dB4, dB6},
    ra-ResponseWindow               ENUMERATED {sl1, sl2, sl4, sl8, sl10, sl20, sl40, sl80},
    ...,
}
RACH-ConfigCommon ::=             SEQUENCE {
    rach-ConfigGeneric              RACH-ConfigGeneric,
    ...,
}
BWP-UplinkCommon ::=             SEQUENCE {
    genericParameters            BWP,
    rach-ConfigCommon               SetupRelease { RACH-ConfigCommon }       OPTIONAL, --
Need M
    pusch-ConfigCommon               SetupRelease { PUSCH-ConfigCommon }       OPTIONAL, --
Need M
    pucch-ConfigCommon               SetupRelease { PUCCH-ConfigCommon }       OPTIONAL, --
Need M
    ...,
    [[
    rach-ConfigCommonIAB-r16         SetupRelease { RACH-ConfigCommon }        OPTIONAL, --
Need M
    useInterlacePUCCH-PUSCH-r16        ENUMERATED {enabled}              OPTIONAL, --
Need R
    msgA-ConfigCommon-r16           SetupRelease { MsgA-ConfigCommon-r16 }       OPTIONAL -
- Cond SpCellOnly2
    ]]
}
UplinkConfigCommonSIB ::=           SEQUENCE {
    frequencyInfoUL               FrequencyInfoUL-SIB,
    initialUplinkBWP              BWP-UplinkCommon,
    timeAlignmentTimerCommon           TimeAlignmentTimer
}
```

A WTRU may use Discontinuous Reception (DRX) in RRC_IDLE and RRC_INACTIVE state in order to reduce power consumption. The WTRU monitors one paging occasion (PO) per DRX cycle. A PO is a set of PDCCH monitoring occasions and can consist of multiple time slots (e.g., subframe or OFDM symbol) where paging DCI can be sent. One Paging Frame (PF) is one Radio Frame and may contain one or multiple PO(s) or starting point of a PO. When multiple cell defining SSBs are configured, paging scheduling information and short message that contains SI modification indication may be transmitted on the CORESET #0s of all cell defining SSBs. An Idle or Inactive WTRU may monitor the paging occasion on one SSB/CORESET #0 to retrieve the paging information. Alternatively, or additionally, to be more robust, an Idle or Inactive -continued

```
    ...,
}
PagingCycle ::=             ENUMERATED {rf32, rf64, rf128, rf256}
```

WTRUs in RRC_CONNECTED may monitor for an SI change indication in any paging occasion, such as at least once per modification period, if the WTRU is provided with common search space on the active BWP to monitor paging. An RRC connected WTRU may monitor the paging occasion on the SSB/CORESET #0 it retrieves the MIB and SIB1 information from (to be termed the "primary" SSB). Alternatively, or additionally, to be more robust, an RRC connected WTRU may monitor the paging occasion among different SSB/CORESET #0s, such as in an alternate fashion, for example.

A WTRU may receive indications about SI modifications using Short Message transmitted in DCI format 1_0 with P-RNTI. If a WTRU receives a Short Message with the systemInfoModification bit set to 1, the WTRU may apply the SI acquisition procedure from the start of the next modification period. An updated SI message may be broadcasted in the modification period following periods where the SI change indication is transmitted. The modification period boundaries are defined by SFN values for which SFN mod m=0, where m is the number of radio frames comprising the modification period. The modification period may be configured by system information in the BCCH-Config IE. Repetitions of SI change indication may occur within preceding modification period. The network may set the same modificationPeriodCoeff on different cell defining SSBs.

```
BCCH-Config ::=                SEQUENCE {
    modificationPeriodCoeff        ENUMERATED {n2,
                                   n4, n8, n16},
    ...
}
DownlinkConfigCommonSIB ::=        SEQUENCE {
    frequencyInfoDL                FrequencyInfoDL-SIB,
    initialDownlinkBWP             BWP-DownlinkCommon,
    bcch-Config                    BCCH-Config,
    pcch-Config                    PCCH-Config,
    ...
}
```

A modification period may be used. Such a modification period may include a variable such as modificationPeriod-Coeff. The actual modification period may be expressed in number of radio frames m=modificationPeriodCoeff*defaultPagingCycle where n2 corresponds to value 2, n4 corresponds to value 4, for example. Upon the triggering of interference being present, the network may be informed of the interference parameters, such as, carrier location, interference bandwidth, angle of arrival (AoA), power spectral density (PSD), for example. The network may assess the impact of the interference by comparing the interference carrier and bandwidth to the existing SSB block frequency domain locations. If the network decides that the interference may disrupt any of the SSB related channel detection possibilities and MIB and SIB1 decoding, the network may update the absoluteFrequencySSB in the SIB1s of the SSBs that are deemed affected by the interference and may remove the impacted SSBs from the absoluteFrequencyOtherSSBs that originally contain the impacted SSBs. The network may set absoluteFrequencySSB to one of the remaining eligible SSBs in the absoluteFrequencyOtherSSBs to direct WTRUs currently on the impacted SSB, or looking for an SSB, to another SSB. The network may set absoluteFrequencySSB to 0 to allow WTRUs to select any of the remaining eligible SSBs in the absoluteFrequencyOtherSSBs. If the multipleCellDefiningSSBs flag is unset and/or absoluteFrequencyOtherSSBs parameter is absent, the network may create a new cell-defining SSB at the synchronization raster location indicated by the absoluteFrequencySSB.

A timer may be created, such as by the network, for example, to allow sufficient time to inform the WTRUs associated with the affected SSB(s) with a SI modification notification via paging short message before stopping the transmission of the impacted SSB upon the expiration of the timer. The timer may be configured such that the cell defining SSB that is affected by the interference operates for a period of time to allow camped WTRUs that are currently operating via the interference affected cell defining SSB to read the SI modification at least once. During the transition period defined by the timer, the network may set the Kssb on the old SSB to 30 for FR1 and 14 for FR2 via the MIB parameter ssb-subcarrierOffset along with the relevant PBCH bit (the latter is for FR1 only) to indicate that the cell defining SSB is being removed. When the detected interference is determined to be insignificant for an extended period of time, the network may reset the absoluteFrequencySSB and Kssb of the affected SSB to point to its own absolute frequency location and start transmitting on the previously affected cell defining SSB.

Even in the presence of multiple interferences with all of the SSB/CORESET #0 being impacted by the interference, it may be possible for a WTRU(s) to receive the SI modification indication. This results from interference potentially being highly directional and highly dynamic as the interference beam sweeps in both azimuth direction and elevation direction. The NR downlink reception may be (even significantly) impacted when the interference points directly to the NR system. When interference is pointing away, which may be majority of the time, the WTRU may still receive the paging short message. In addition, interferences at different frequency locations from multiple interference generators may point at the NR system at different time instances. These variations over time may improve the potential that WTRU can receive SI modification indication, especially when WTRU monitors the paging occasion on different SSB/CORESET #0 alternately for different DRX cycle.

On the WTRU side, if the WTRU is able to acquire the MIB and SIB1 despite the interference, such as due to the SSB WTRU tries to acquire MIB/SIB1 from is not in the operating RADAR bandwidth, or because at the time WTRU tries to acquire MIB/SIB1, the SSB/CORESET #0 is not subject to significant interference even though the SSB/CORESET #0 bandwidth still falls in the operating bandwidth, for example, and retrieves the SIB1 information that contains the absoluteFrequencySSB and other cell defining SSBs currently available,

```
if the multipleCellDefiningSSBs flag (i.e., the previous spare bit) in the
MIB is set, and the WTRU is capable of
supporting multiple cell defining SSBs,
    if Kssb = 30 for FR1 or Kssb = 14 for FR2 in the MIB (cell defining
    SSB being removed),
        if absoluteFrequencySSB in the FrequencyInfoDL-SIB IE is in the
        list of
        absoluteFrequencyOtherSSBs,
            the WTRU reads the SIB1 associated with the cell defining SSBs
            indicated in the
            absoluteFrequencySSB,
            the WTRU performs random access using the RACH resources
            associated with the
            cell defining SSB indicated in the absoluteFrequencySSB;
        else (e.g., absoluteFrequencySSB = 0),
            the WTRU reads one or more SIB1 associated with the cell
            defining SSBs indicated in
            the absoluteFrequencyOtherSSBs,
            the WTRU may perform random access using the RACH resources
            associated with
            one of the cell defining SSBs listed in
            absoluteFrequencyOtherSSBs,
            alternatively, the WTRU may perform random access using the
            RACH resources
            among all or a subset of the cell defining SSBs that are still
            eligible;
    elseif Kssb ≤ 23 for FR1 or Kssb ≤ 11 for FR2 in the MIB (cell
    defining SSB),
``` if absoluteFrequencySSB aligns with the frequency of the SSB
    WTRU acquires MIB/SIB1 from,
        the WTRU performs random access using the RACH resources
        associated with the
        SSB WTRU acquires MIB/SIB1 from;
    elseif absoluteFrequencySSB in the FrequencyInfoDL-SIB IE is in
    the list of
    absoluteFrequencyOtherSSBs,
        the WTRU reads the SIB1 associated with the cell defining SSBs
        indicated in the
        absoluteFrequencySSB,
        the WTRU performs random access using the RACH resources
        associated with the
        cell defining SSB indicated in the absoluteFrequencySSB;
    Else (e.g., absoluteFrequencySSB = 0),
        the WTRU reads one or more SIB1 associated with the cell
        defining SSBs indicated in
        the absoluteFrequencyOtherSSBs,
        the WTRU may perform random access using the RACH resources
        associated with
        the SSB WTRU acquires MIB/SIB1 from or one of the cell
        defining SSBs listed in
        absoluteFrequencyOtherSSBs,
        alternatively, the WTRU may perform random access using the
        RACH resources
        among all or a subset of the cell defining SSBs provided in the cell
        (i.e., including the
        SSB WTRU acquires MIB/SIB1 from and some other cell defining
        SSBs indicated in
        the SIB1);
else (i.e., multipleCellDefiningSSBs flag is unset or the WTRU is not
capable of supporting multiple cell defining
SSBs),
    if Kssb = 30 for FR1 or Kssb = 14 for FR2 in the MIB (cell defining
    SSB being removed),
        the WTRU reads the MIB and SIB1 information associated with the
        cell defining SSB indicated
        by the absoluteFrequencySSB,
        the WTRU performs random access using the RACH resources
        provided by the new SIB1;
    elseif Kssb ≤ 23 for FR1 or Kssb ≤ 11 for FR2 in the MIB (cell
    defining SSB),
        the WTRU ignores absoluteFrequencySSB and proceed with the
        initial access process based
        on the RACH information provided by the SIB1.

During the transition time when two SSBs coexist (such
as an old SSB and an SSB being migrated to), a camped
WTRU may receive MIB and SIB1 from the old SSB as the
WTRU possesses the subcarrier offset between the SSB and
common resource grid via MIB, while an emerging WTRU
will not be able to receive SIB1 in the old SSB since Kssb
has been set to 30 (FR1)/14 (FR2).

If the WTRU is able to acquire the MIB but unable to acquire the SIB1,
if the multipleCellDefiningSSBs flag (i.e., the spare bit) is set, and the
WTRU is capable of supporting multiple cell
defining SSBs,
    if the WTRU is camped on the cell and has stored MIB and SIB1
    information for other cell defining SSBs,
        the WTRU proceeds to read the MIB and SIB1 information from
        another stored cell defining
        SSB selected by the WTRU,
            This process may involve further iterations (e.g., if the WTRU still
            cannot read the MIB
            and/or SIB1 from the alternative SSB selected, the WTRU may try
            a second alternative
            SSB, if available in the stored memory),
            WTRU may also make the SSB selection from the stored SIB1
            information based on
            its own observation of the frequency domain interference,
        if WTRU is able to decode MIB and SIB1 from any of the stored cell
        defining SSBs,
            the WTRU may perform random access using the RACH resources
            provided by the
            selected SIB1, alternatively, WTRU reads the absoluteFrequencyOtherSSBs in
the selected SIB 1
and perform random access using the RACH resources among all
or a subset of the
cell defining SSBs that are deemed eligible;
else,
    if the field intraFreqReselection in initial MIB is set to "allowed",
        the WTRU scans the synchronization raster to select another
        cell defining
        SSB on the same cell or another cell on the same frequency,
        whichever has
        stronger SSB measurement results,
    else,
        the WTRU scans the synchronization raster to find another cell
        defining SSB
        on the same cell only;
else (e.g., the WTRU is emerging and has no stored SIB1 information),
    if the field intraFreqReselection in MIB message is set to "allowed",
        the WTRU scans the synchronization raster to select another
        cell defining SSB on the
        same cell or another cell on the same frequency, whichever has
        stronger SSB
        measurement results,
    else,
        the WTRU scans the synchronization raster to find another cell
        defining SSB on the
        same cell only;
else (i.e., multipleCellDefiningSSBs flag is unset or WTRU is not capable
of supporting multiple cell defining
SSBs),
    if Kssb = 30 for FR1 or Kssb = 14 for FR2 (cell defining SSB being
    removed),
        if the field intraFreqReselection in MIB message is set to "allowed",
            the WTRU scans the synchronization raster to select another cell
            defining SSBs on
            the same cell or another cell on the same frequency, whichever
            gives stronger SSB
            measurement results,
        else,
            the WTRU scans the synchronization raster to find another cell
            defining SSB on the
            same cell only;
    elseif Kssb ≤ 23 for FR1 or Kssb ≤ 11 for FR2 in the MIB (cell
    defining SSB),
        the WTRU considers the cell as barred and follow the procedures
        accordingly,
        if the field intraFreqReselection in MIB message is set to "allowed",
            the WTRU may select another cell on the same frequency if
            re-selection criteria are
            fulfilled,
            the WTRU excludes the barred cell as a candidate for cell
            selection/reselection for 300
            seconds;
    else (the corresponding SSB is not cell defining),
        the WTRU can find the cell defining SSB as specified by the Kssb.
If a WTRU is unable to acquire the MIB,
if the WTRU is camped on the cell and has stored MIB and SIB1
information for other cell defining SSBs,
    if the multipleCellDefining SSBs flag (i.e., the spare bit) in the stored
    MIB is set, and the WTRU is capable
    of supporting multiple cell defining SSBs,
        the WTRU proceeds to read the MIB and SIB1 information from
        another cell defining SSB
        selected by the WTRU,
            This process may involve further iterations.
            the WTRU may also make the SSB selection from the stored SIB1
            information based
            on its own observation of the frequency domain interference,
        if WTRU is able to decode MIB and SIB1 from any of the stored cell
        defining SSBs,
            the WTRU may perform random access using the RACH resources
            provided by the
            selected SIB1,
            alternatively, the WTRU may read the
            absoluteFrequencyOtherSSBs in the selected
            SIB1 and perform random access using the RACH resources
            among all or a subset of
            the cell defining SSBs that are deemed eligible, -continued

```
else,
    if the field intraFreqReselection in stored MIB is set to "allowed",
    the WTRU scans the synchronization raster to select another
    cell defining
```

Different signaling approaches such as MAC-CE may also be considered to signal the "primary" SSB switching. After receiving the updated "primary" cell-defining SSB frequency location, the WTRU may read the MIB and SIB1 from the new "primary" cell-defining SSB to retrieve absoluteFrequencyOtherSSBs and other system information.

```
FrequencyInfoDL ::=                SEQUENCE {
    absoluteFrequencySSB               ARFCN-ValueNR          OPTIONAL, -- Cond
SpCellAdd
    frequencyBandList              MultiFrequencyBandListNR,
    absoluteFrequencyPointA            ARFCN-ValueNR,
    scs-SpecificCarrierList            SEQUENCE (SIZE (1..maxSCSs)) OF SCS-SpecificCarrier,
    ...
}
DownlinkConfigCommon ::=               SEQUENCE {
    frequencyInfoDL                FrequencyInfoDL            OPTIONAL, -- Cond
InterFreqHOAndServCellAdd
    initialDownlinkBWP                 BWP-DownlinkCommon         OPTIONAL, -- Cond ServCellAdd
    ...
}
ServingCellConfigCommon ::=        SEQUENCE {
    physCellId                     PhysCellId                 OPTIONAL, -- Cond
HOAndServCellAdd,
    downlinkConfigCommon               DownlinkConfigCommon       OPTIONAL, -- Cond
HOAndServCellAdd
    uplinkConfigCommon                 UplinkConfigCommon         OPTIONAL, -- Need M
    ...,
}
```

-continued

```
        SSBs on the same cell or another cell on the same frequency,
        whichever has
        stronger SSB measurement results,
    else,
        the WTRU scans the synchronization raster to find another cell
        defining SSB
        on the same cell only;
else (i.e., multipleCellDefiningSSBs flag in the stored MIB is unset or
WTRU is not capable of supporting
multiple cell defining SSBs)
    the WTRU considers the cell as barred and performs barring as if
    intraFreqReselection is set
    to allowed, and follows the associated procedures,
        the WTRU may exclude the barred cell as a candidate for cell
        selection/reselection for
        up to 300 seconds,
        the WTRU may select another cell on the same frequency if the
        selection criteria are
        fulfilled;
else (e.g., the WTRU is emerging and has no stored SIB1 information),
    the WTRU considers the cell as barred and performs barring as if
    intraFreqReselection is set to allowed,
    and follows the associated procedures,
        the WTRU may exclude the barred cell as a candidate for cell
        selection/reselection for up to
        300 seconds,
        the WTRU may select another cell on the same frequency if the
        selection criteria are fulfilled.
```

For RRC connected WTRUs, beam switching/recovery and mobility management is performed on the latest SSB the WTRU retrieves the MIB/SIB1 system information from (to be referred to as the WTRU specific "primary" cell defining SSB). In addition, the network may dynamically signal the RRC connected WTRUs to switch the "primary" SSB frequency location via dedicated RRC signaling. To this end, the existing absoluteFrequencySSB in the FrequencyInfoDL IE associated with the DownlinkConfigCommon IE may be used to indicate the new "primary" SSB frequency location for the WTRU. From the network point of view, different "primary" SSBs may be allocated to different WTRUs.

A WTRU may inform the network of its capability to support multiple cell defining SSBs within a serving cell. TABLE 3 provides an exemplary message used to inform the network of the capability to support multiple cell defining SSBs within a serving cell.

TABLE 3

| | | | |
|---|---|---|---|
| SSB interference coordination using time-frequency interleaved cell defining SSBs | | | |
| Definitions for parameters | Per | FDD-TDD DIFF | FR1-FR2 DIFF |
| multipleCellDefiningSSBs Indicates whether the UE supports multiple cell defining SSBs within a serving cell. | UE No | No | No |

FIG. 11 illustrates a method 1100 performed in a WTRU. Method 1100 includes detecting at least one cell defining SSB (CD-SSB) at 1110. Method 1100 includes extracting information from the detected CD-SSB, such as MIB, for example, to determine a presence of other CD-SSBs at 1120. Method 1100 includes extracting an indication from the detected CD-SSB, such as MIB, for example, that the detected CD-SSB is to be removed at 1130. Method 1100 includes reading a SIB, such as SIB1, for example, associated with the detected CD-SSB to extract at least frequency location information associated with at least one other CD-SSB at 1140. Method 1100 includes reading, using the frequency location information, a SIB, such as SIB1, for example, associated with the at least one other CD-SSB at 1150. Method 1100 includes performing random access using RACH resources corresponding to the read SIB1 at 1160.

Method 1100 may include, if the detected CD-SSB is to be removed and there are other CD-SSBs, reading at least one SIB1 associated with at least one other CD-SSB indicated by the SIB1 of the detected CD-SSB and performing random access using RACH resources corresponding to the read at least one SIB1. Method 1100 may include, if a SSB frequency location indicated in the SIB1 of the detected CD-SSB is in a list of SSB frequency locations of other CD-SSBs, reading the SIB1 associated with the CD-SSB with frequency location indicated in the SIB1 of the detected CD-SSB, and perform random access using RACH resources corresponding to the read SIB1. Method 1100 may include the SSB frequency location indicated in the SIB1 associated with a CD-SSB is updated based on the CD-SSB being impacted by interference. Method 1100 may include interference is by RADAR. Method 1100 may include sending a flag indicating the ability to operate with multiple cell defining SSBs. Method 1100 may include transmission of a first of the CD-SSBs and a second of the CD-SSBs are interleaved in a time domain. Method 1100 may include the interleaving includes a frame offset and a half bit offset. Method 1100 may include receiving at least one short message paged using a coreset of the at least one CD-SSB. Method 1100 may include the at least one short message is received within a DRX cycle and the at least one short message indicates an SI modification notification.

FIG. 12 through 17 provide SSB interference coordination using time-frequency interleaved cell defining SSBs. Each of FIG. 12 through 17 is described below.

Figure 12:
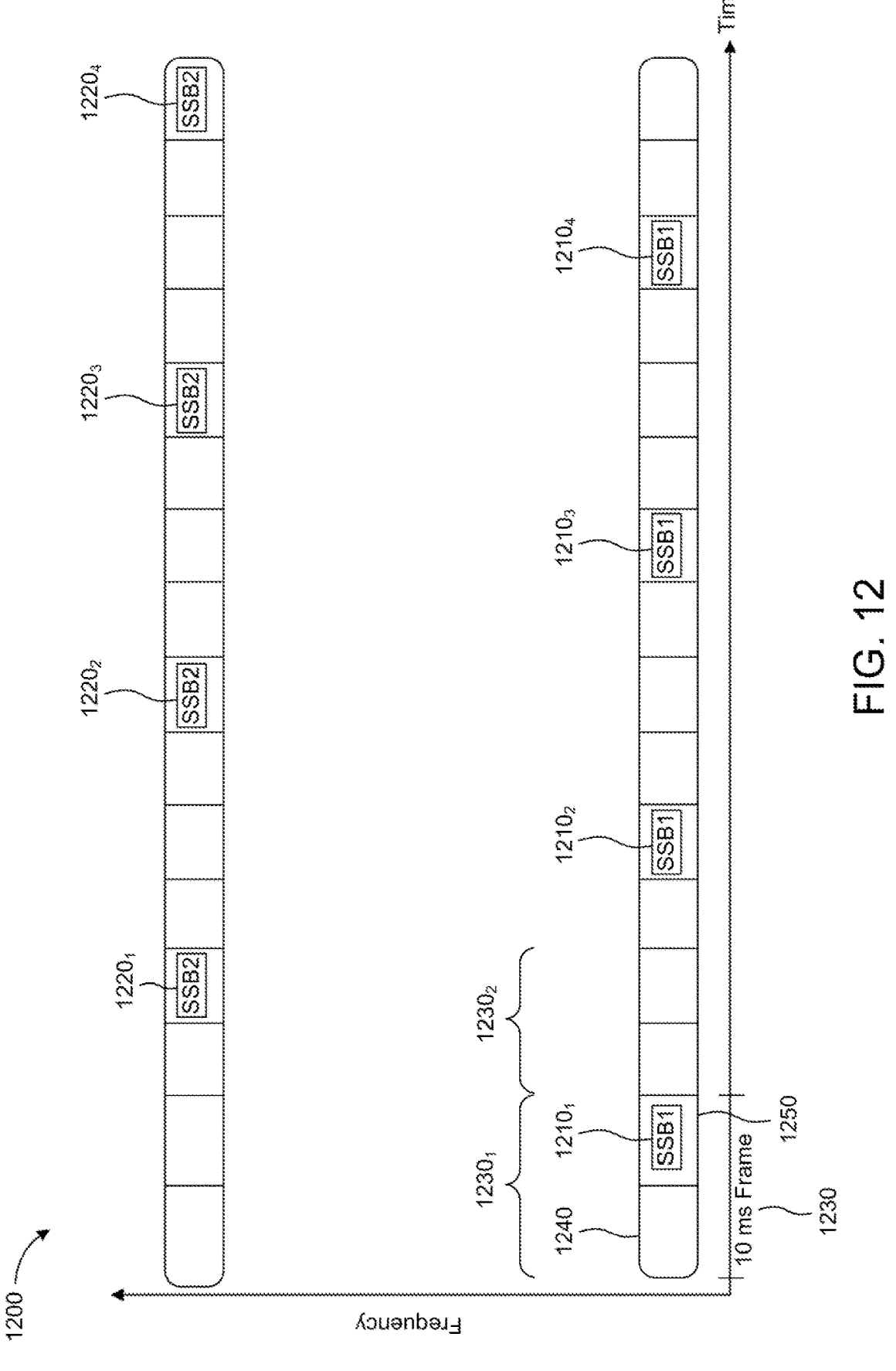
FIG. 12 illustrates a time-frequency pattern of two interleaved cell defining SSBs with one SSB operating in the second half of a first frame and the other SSB operating in the second half of the second frame.

FIG. 12 illustrates a time-frequency pattern 1200 of two interleaved cell defining SSBs with one SSB operating in the second half of a first frame and the other SSB operating in the second half of the second frame. Pattern A00 includes an SSB1 1210 operating in a second half 1250 of a first frame 1230$_1$ and an SSB2 1220 operating in the second half 1250 of a second frame 1230$_2$. SSB1 1210 is depicted as operating at a lower frequency than SSB2 1220. Although as would be understood by those possessing an ordinary skill in the art, other configurations may also be utilized.

As is illustrated in FIG. 12, a series of frames 1230 are provided in the time domain. Each of the series of frames 1230 may be divided into a first half 1240 of the frame 1230 and a second half 1250 of the frame 1230. SSB1 1210 may be burst in the second half 1250 of a first frame 1230$_1$ in the series of frames 1230. SSB1 1210 refers to the collective of each burst in the second half 1250 of the odd frames 1230 starting with frame 1230$_1$, where the SSBs are identified as SSB1 1210$_1$ in the first frame, SSB1 1210$_2$ in the third frame, SSB1 1210$_3$ in the fifth frame, and SSB1 1210$_4$ in the seventh frame. SSB2 1220 refers to the collective of each burst in the second half 1250 of each of the even frames 1230 starting with frame 1230$_2$, where the SSBs are identified as SSB2 1220$_1$ in the second frame, SSB2 1220$_2$ in the fourth frame, SSB2 1220$_3$ in the sixth frame, and SSB2 1220$_4$ in the eighth frame.

Figure 13:
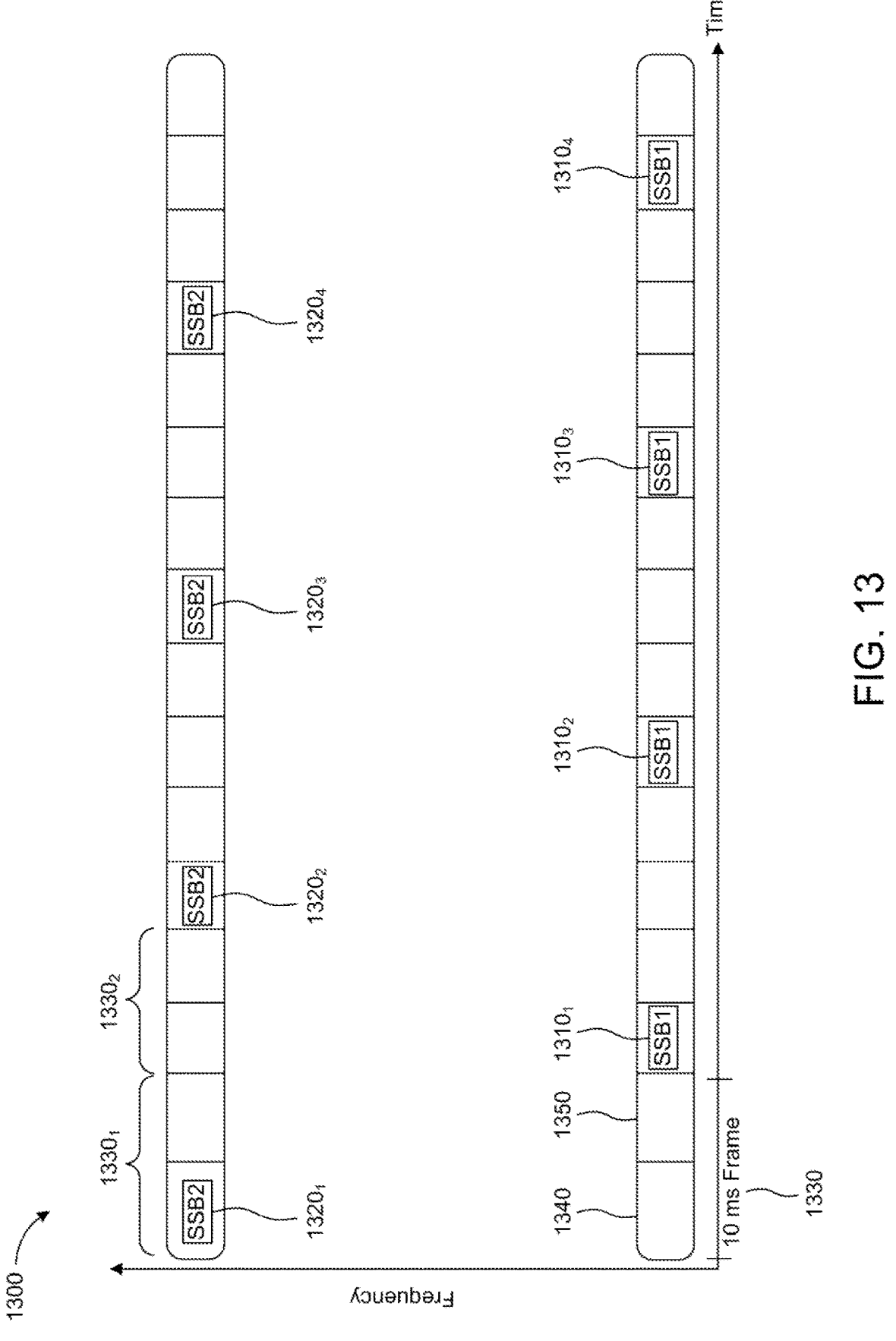
FIG. 13 illustrates a time-frequency pattern of two interleaved cell defining SSBs with one SSB operating in the first half of a first frame and the other SSB operating in the first half of the second frame.

FIG. 13 illustrates a time-frequency pattern B00 of two interleaved cell defining SSBs with one SSB operating in the first half of a first frame and the other SSB operating in the first half of the second frame. Pattern B00 includes an SSB1 B10 operating in a first half B40 of a second frame B30$_2$ and an SSB2 B20 operating in the first half B40 of a first frame B30$_1$. SSB1 B10 is depicted as operating at a lower frequency than SSB2 B20. Although as would be understood by those possessing an ordinary skill in the art, other configurations may also be utilized.

As is illustrated in FIG. 13, a series of frames 1330 are provided in the time domain. Each of the series of frames 1330 may be divided into a first half 1340 of the frame 1330 and a second half 1350 of the frame 1330. SSB1 1310 may be burst in the first half 1340 of a second frame 1330$_2$ in the series of frames 1330. SSB1 1310 refers to the collective of each burst in the first half 1340 of the even frames 1330 starting with frame 1330$_2$, where the SSBs are identified as SSB1 1310$_1$ in the second frame, SSB1 1310$_2$ in the fourth frame, SSB1 1310$_3$ in the sixth frame, and SSB1 1310$_4$ in the eighth frame. SSB2 1320 refers to the collective of each burst in the first half 1340 of each of the odd frames 1330 starting with frame 1330$_1$, where the SSBs are identified as SSB2 1320$_1$ in the first frame, SSB2 1320$_2$ in the third frame, SSB2 1320$_3$ in the fifth frame, and SSB2 1320$_4$ in the seventh frame.

Figure 14:
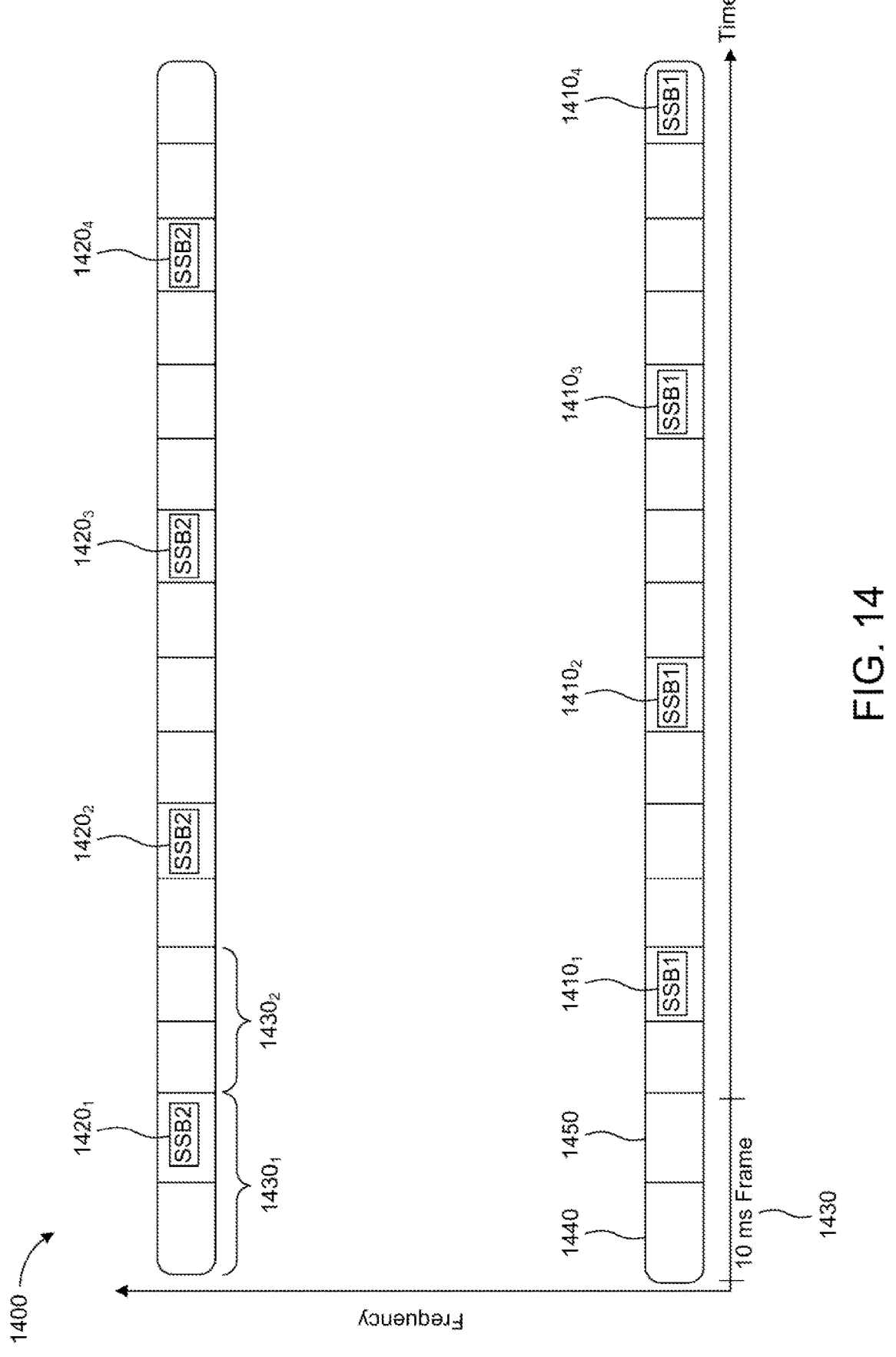
FIG. 14 illustrates a time-frequency pattern of two interleaved cell defining SSBs with one SSB operating in the second half of a first frame and the other SSB operating in the second half of the second frame.

FIG. 14 illustrates a time-frequency pattern C00 of two interleaved cell defining SSBs with one SSB operating in the second half of a first frame and the other SSB operating in the second half of the second frame. Pattern C00 includes an SSB1 C10 operating in a second half C50 of a second frame C30$_2$ and an SSB2 C20 operating in the second half C50 of a first frame C30$_1$. SSB1 C10 is depicted as operating at a lower frequency than SSB2 C20. Although as would be understood by those possessing an ordinary skill in the art, other configurations may also be utilized.

As is illustrated in FIG. 14, a series of frames 1430 are provided in the time domain. Each of the series of frames 1430 may be divided into a first half 1440 of the frame 1430 and a second half 1450 of the frame 1430. SSB1 1410 may be burst in the second half 1450 of a second frame 1430$_2$ in the series of frames 1430. SSB1 1410 refers to the collective of each burst in the second half 1450 of the even frames 1430 starting with frame 1430$_2$, where the SSBs are identified as SSB1 1410$_1$ in the second frame, SSB1 1410$_2$ in the fourth frame, SSB1 1410$_3$ in the sixth frame, and SSB1 1410$_4$ in the eighth frame. SSB2 1420 refers to the collective of each burst in the second half 1450 of each of the odd frames 1430 starting with frame 1430$_1$, where the SSBs are identified as SSB2 1420$_1$ in the first frame, SSB2 1420$_2$ in the third frame, SSB2 1420$_3$ in the fifth frame, and SSB2 1420$_4$ in the seventh frame.

Figure 15:
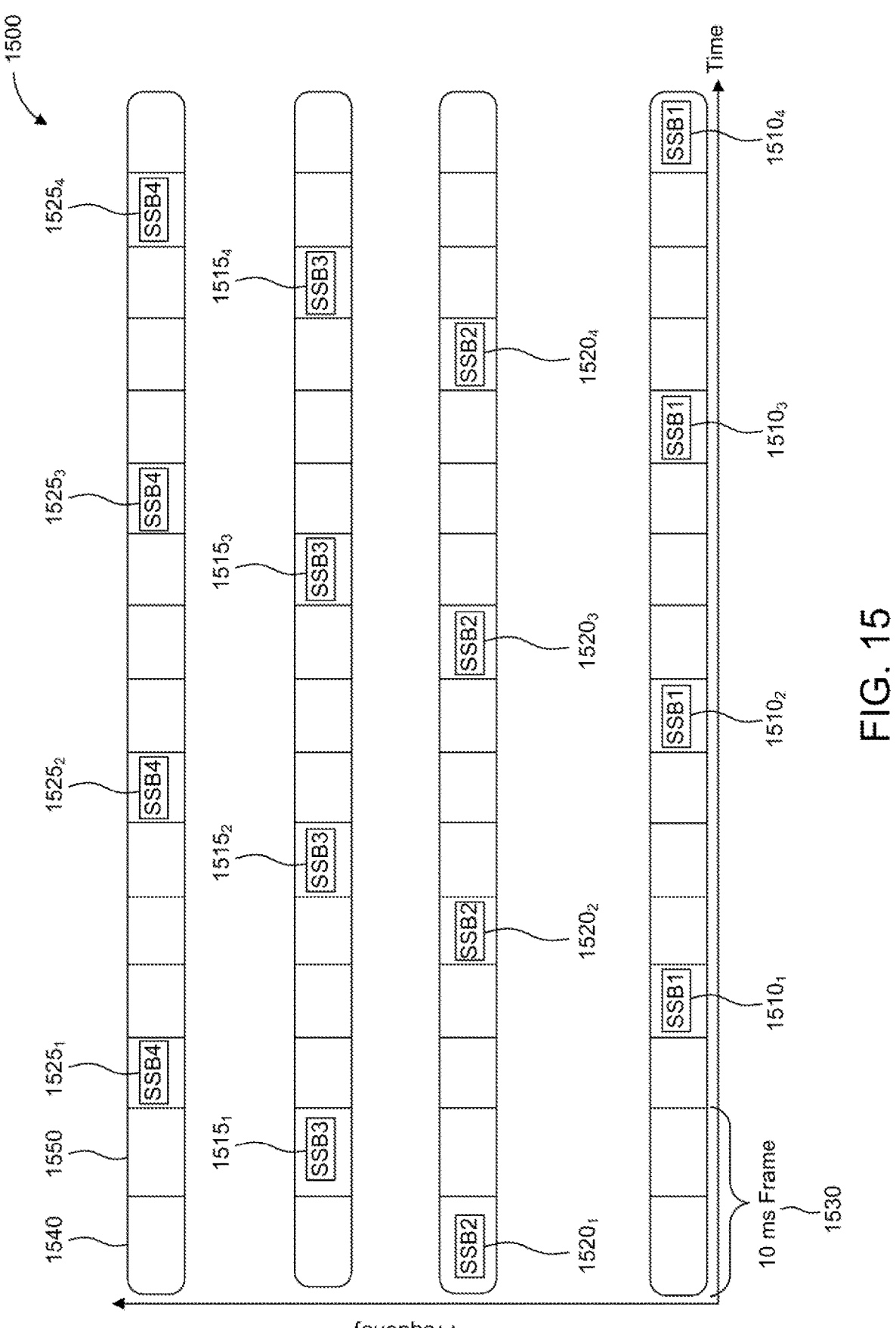
FIG. 15 illustrates a time-frequency pattern of four interleaved cell defining SSBs with one SSB operating in consecutive half frames over a period of two frames.

FIG. 15 illustrates a time-frequency pattern 1500 of four interleaved cell defining SSBs with one SSB operating in consecutive half frames over a period of two frames. Pattern 1500 includes an SSB1 1510 operating in the second half 1550 of a frame that is an even frame in a series of frames 1530, an SSB2 1520 operating in the first half 1540 of a frame that is an odd frame in a series of frames 1530, an SSB31 1515 operating in the second half 1550 of a frame that is an odd frame in a series of frames 1530, and an SSB42 1525 operating in the first half 1540 of a frame that is an odd frame in a series of frames 1530. SSB1 1510 is depicted as operating at a lower frequency than SSB2 1520, SSB2 1520 lower than SSB3 1515, and SSB3 1515 lower than SSB 4 1525. Although as would be understood by those possessing an ordinary skill in the art, other configurations may also be utilized.

As is illustrated in FIG. 15, a series of frames 1530 are provided in the time domain. Each of the series of frames 1530 may be divided into a first half 1540 of the frame 1530 and a second half 1550 of the frame 1530. SSB1 1510 may be burst in the second half 1550 of each even frame in the series of frames 1530. SSB1 1510 refers to the collective of each burst in the second half 1550 of the even frame 1530 identified as SSB1 1510$_1$ in the second frame, SSB1 1510$_2$ in the fourth frame, SSB1 1510$_3$ in the sixth frame, and SSB1 1510$_4$ in the eighth frame. SSB2 1520 refers to the collective of each burst in the first half 1540 of the odd frame 1530 identified as SSB2 1520$_1$ in the first frame, SSB2 1520$_2$ in the third frame, SSB2 1520$_3$ in the fifth frame, and SSB2 1520$_4$ in the seventh frame. SSB3 1515 refers to the collective of each burst in the second half 1550 of the odd frame 1530 identified as SSB3 1515$_1$ in the first frame, SSB3

$1515_2$ in the third frame, SSB3 $1515_3$ in the fifth frame, and SSB3 $1515_4$ in the seventh frame. SSB4 1525 refers to the collective of each burst in the first half 1540 of the even frame 1530 identified as SSB4 $1525_1$ in the second frame, SSB4 $1525_2$ in the fourth frame, SSB4 $1525_3$ in the sixth frame, and SSB4 $1525_4$ in the eighth frame.

Figure 16:
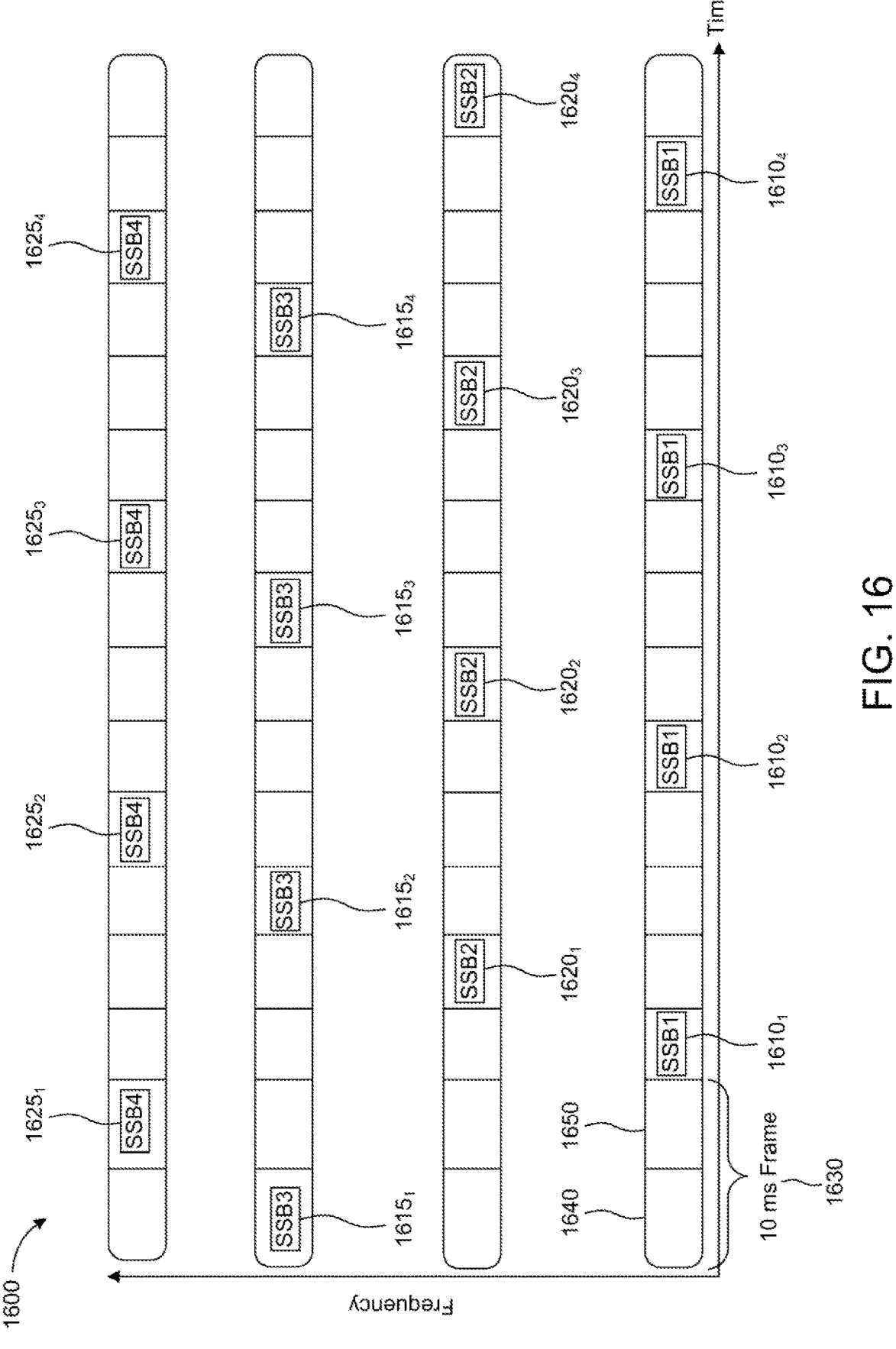
FIG. 16 illustrates a time-frequency pattern of four interleaved cell defining SSBs with one SSB operating in consecutive half frames over a period of two frames.

FIG. 16 illustrates a time-frequency pattern 1600 of four interleaved cell defining SSBs with one SSB operating in consecutive half frames over a period of two frames. Pattern 1600 includes an SSB1 1610 operating in the first half 1640 of a frame that is an even frame in a series of frames 1630, an SSB2 1620 operating in the second half 1650 of a frame that is an even frame in a series of frames 1630, an SSB31 1615 operating in the first half 1640 of a frame that is an odd frame in a series of frames 1630, and an SSB42 1625 operating in the second half 1650 of a frame that is an odd frame in a series of frames 1630. SSB1 1610 is depicted as operating at a lower frequency than SSB2 1620, SSB2 1620 lower than SSB3 1615, and SSB3 1615 lower than SSB 4 1625. Although as would be understood by those possessing an ordinary skill in the art, other configurations may also be utilized.

As is illustrated in FIG. 16, a series of frames 1630 are provided in the time domain. Each of the series of frames 1630 may be divided into a first half 1640 of the frame 1630 and a second half 1650 of the frame 1630. SSB1 1610 may be burst in the first half 1640 of each even frame in the series of frames 1630. SSB1 1610 refers to the collective of each burst in the first half 1640 of the even frame 1630 identified as SSB1 $1610_1$ in the second frame, SSB1 $1610_2$ in the fourth frame, SSB1 $1610_3$ in the sixth frame, and SSB1 $1610_4$ in the eighth frame. SSB2 1620 refers to the collective of each burst in the second half 1650 of the even frame 1630 identified as SSB2 $1620_1$ in the second frame, SSB2 $1620_2$ in the fourth frame, SSB2 $1620_3$ in the sixth frame, and SSB2 $1620_4$ in the eighth frame. SSB3 1615 refers to the collective of each burst in the first half 1640 of the odd frame 1630 identified as SSB3 $1615_1$ in the first frame, SSB3 $1615_2$ in the third frame, SSB3 $1615_3$ in the fifth frame, and SSB3 $1615_4$ in the seventh frame. SSB4 1625 refers to the collective of each burst in the second half 1650 of the odd frame 1630 identified as SSB4 $1625_1$ in the first frame, SSB4 $1625_2$ in the third frame, SSB4 $1625_3$ in the fifth frame, and SSB4 $1625_4$ in the seventh frame.

Figure 17:
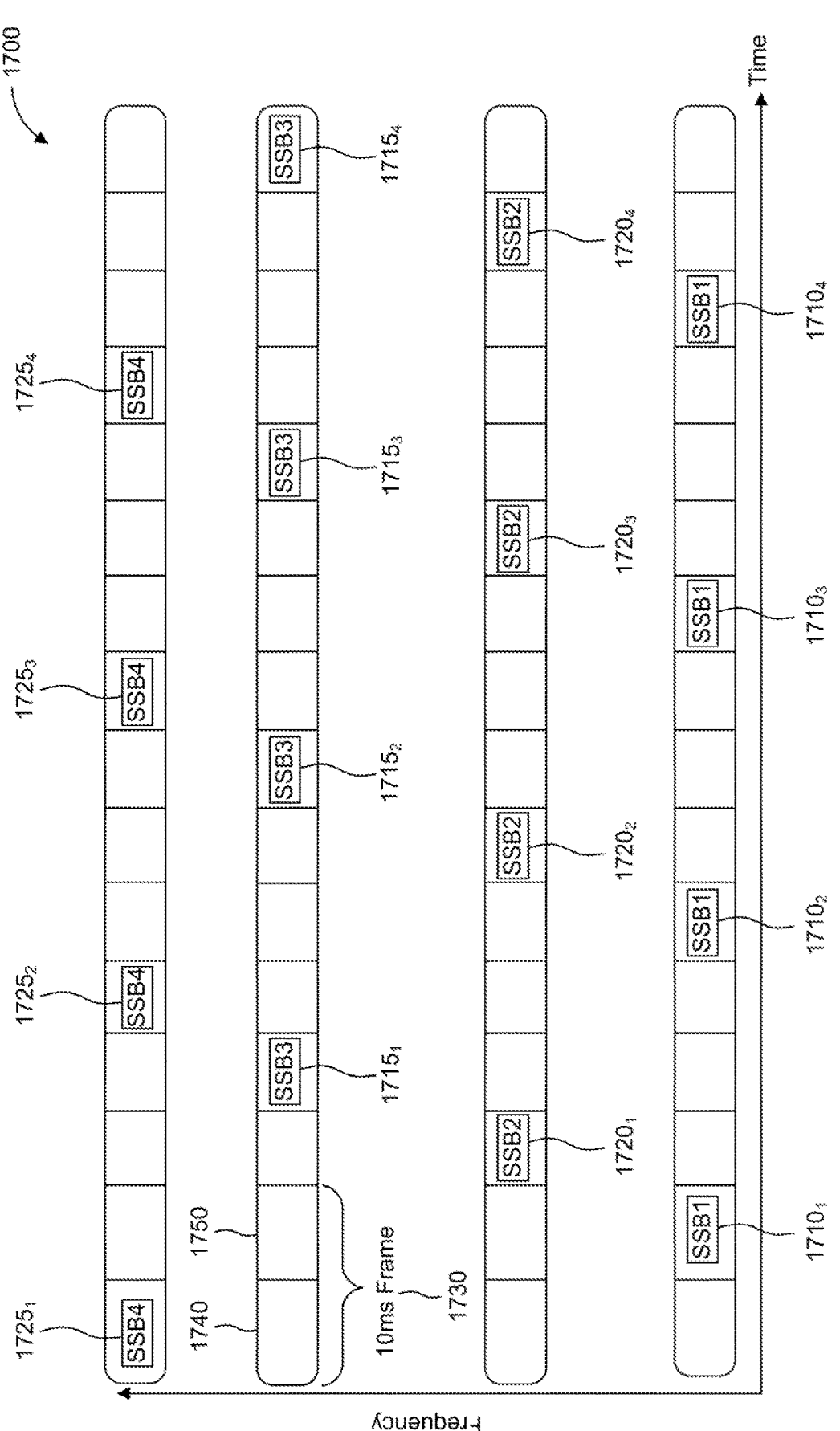
FIG. 17 illustrates a time-frequency pattern of four interleaved cell defining SSBs with one SSB operating in consecutive half frames over a period of two frames.

FIG. 17 illustrates a time-frequency pattern 1700 of four interleaved cell defining SSBs with one SSB operating in consecutive half frames over a period of two frames. Pattern 1700 includes an SSB1 1710 operating in the second half 1750 of a frame that is an odd frame in a series of frames 1730, an SSB2 1720 operating in the first half 1740 of a frame that is an even frame in a series of frames 1730, an SSB3 1715 operating in the second half 1750 of a frame that is an even frame in a series of frames 1730, and an SSB4 1725 operating in the first half 1740 of a frame that is an odd frame in a series of frames 1730. SSB1 1710 is depicted as operating at a lower frequency than SSB2 1720, SSB2 1720 lower than SSB3 1715, and SSB3 1715 lower than SSB4 1725. Although as would be understood by those possessing an ordinary skill in the art, other configurations may also be utilized.

As is illustrated in FIG. 17, a series of frames 1730 are provided in the time domain. Each of the series of frames 1730 may be divided into a first half 1740 of the frame 1730 and a second half 1750 of the frame 1730. SSB1 1710 may be burst in the second half 1750 of each odd frame in the series of frames 1730. SSB1 1710 refers to the collective of each burst in the second half 1750 of the odd frame 1730 identified as SSB1 $1710_1$ in the first frame, SSB1 $1710_2$ in the third frame, SSB1 $1710_3$ in the fifth frame, and SSB1 $1710_4$ in the seventh frame. SSB2 1720 refers to the collective of each burst in the first half 1740 of the even frame 1730 identified as SSB2 $1720_1$ in the second frame, SSB2 $1720_2$ in the fourth frame, SSB2 $1720_3$ in the sixth frame, and SSB2 $1720_4$ in the eighth frame. SSB3 1715 refers to the collective of each burst in the second half 1750 of the even frame 1730 identified as SSB3 $1715_1$ in the second frame, SSB3 $1715_2$ in the fourth frame, SSB3 $1715_3$ in the sixth frame, and SSB3 $1715_4$ in the eighth frame. SSB4 1725 refers to the collective of each burst in the first half 1740 of the odd frame 1730 identified as SSB4 $1725_1$ in the first frame, SSB4 $1725_2$ in the third frame, SSB4 $1725_3$ in the fifth frame, and SSB4 $1725_4$ in the seventh frame.

If SSB beams of the neighboring cells within the same gNB are allocated with the same time-frequency resources, the SSB beams can interfere with each other via the sidelobe of the beam. In an example, to alleviate the intra-gNB inter-cell SSB interference is through interference coordination where different "orthogonal" interleaving pattern can be applied on different cells, for example. For example, a gNB with two cells/sectors can apply the time-frequency pattern 1 of two interleaved SSBs in cell 1 (as depicted in FIG. 8), the time-frequency pattern 2 of two interleaved SSBs in cell 2 (as depicted in FIG. 15), the time-frequency pattern 3 of two interleaved SSBs in cell 3 (as depicted in FIG. 16), and the time-frequency pattern 4 of two interleaved SSBs in cell 4 (as depicted in 17). At any given time, the SSB beams from the different cells are transmitting on different frequency locations, alleviating the inter-cell SSB interference, while protecting the 5G system from narrow band high power interference.

Alternatively, in an example, a gNB with four cells/sectors may apply the time-frequency pattern 1 of four interleaved SSBs in cell 1 (as depicted in FIG. 9), the time-frequency pattern 2 of four interleaved SSBs in cell 2 (as depicted in FIG. 15), the time-frequency pattern 3 of four interleaved SSBs in cell 3 (as depicted in FIG. 16), and the time-frequency pattern 4 of four interleaved SSBs in cell 4 (as depicted in 17). At any given time, the SSB beams from different cells are transmitting on different frequency locations, alleviating the inter-cell SSB interference, while protecting the 5G system from narrow band high power interference.

In an example, time-frequency interleaved cell defining SSBs based high power narrowband interference avoidance may be utilized. A minimum of two or more cell defining SSB locations that are far apart in the carrier band or a set of time-frequency interleaved cell defining SSBs may be allocated. If one of the cell defining SSBs is corrupted by the high-power narrowband interferer, other SSB(s) that are not affected may be used to sustain the 5G operation. The interleaved cell defining SSB pattern ensures that there is at most one SSB burst set transmitting at any 5 ms half-frame duration.

An external node to the network may determine the interferer characteristics such as carrier frequency, bandwidth, periodicity, dwell time, AoA, and PSD. These measurements can also be determined within the wireless network by observing the measurements relevant to both WTRUs and the gNBs. The PSD level passing a predefined threshold triggers an event, such as switching from an SSB, for example. Upon the event triggering, the network informs the WTRUs associated with the interference affected SSB to change to another SSB with the same or different time-frequency pattern, and then to switch off the interference affected SSB such that any new accessing WTRUs will use the SSB(s) that are not impaired by the interference.

In an example, the network determines the impacted SSB and updates Kssb (30 for FR1 and 14 for FR2) in the PBCH/MIB of the impacted SSB, updates absoluteFrequencySSBs in the SIB1 of the impacted SSB, and updates absoluteFrequencyOtherSSBs, frameOffsetOtherSSBs, and halfFrameOtherSSBs in the SIB1 on all SSBs to remove all the impacted SSBs. The network notifies the WTRU about the SI modification using paging short message. The network may transmit paging short messages over all CORESET #0s and idle/inactive WTRUs can monitor paging alternately among the multiple CORESET #0s within a DRX cycle, or across DRX cycles, or a hybrid approach. The network transmits the impacted SSBs for the transient time so that the WTRUs currently on this SSB have at least a chance to understand the need to move to another SSB location before the impacted SSB location is removed altogether.

The behavior of the WTRU is described below.

If the WTRU is able to acquire the MIB and SIB1 despite the interference and retrieves the SIB1 information (which contains other cell defining SSBs currently available), the following procedure is followed.

```
if the multipleCellDefiningSSBs flag in the MIB is set, and the WTRU
is capable of supporting multiple cell defining
SSBs,
    if Kssb = 30 for FR1 or 14 for FR2 (cell defining SSB being
    removed),
        if absoluteFrequencySSB in the FrequencyInfoDL-SIB IE is in the
        list of
        absoluteFrequencyOtherSSBs,
            the WTRU reads the SIB1 associated with the cell defining
SSBs
            indicated in the
            absoluteFrequencySSB,
            the WTRU performs random access using the RACH resources
            associated with the
            cell defining SSB indicated in the absoluteFrequencySSB,
        else (e.g., absoluteFrequencySSB = 0),
            the WTRU reads one or more SIB1 associated with the cell
            defining SSBs indicated in
            the absoluteFrequencyOtherSSBs,
            the WTRU may perform random access using the RACH
            resources associated with
            one of the SSBs listed in the absoluteFrequencyOtherSSBs,
            alternatively, the WTRU may perform random access using the
            RACH resources
            among all or a subset of the cell defining SSBs that are still
            eligible,
    elseif Kssb ≤ 23 for FR1 or Kssb ≤ 11 for FR2 (cell defining SSB),
        if absoluteFrequencySSB aligns with the frequency of the SSB
        WTRU acquires MIB/SIB1 from,
            the WTRU performs random access using the RACH resources
            associated with the
            SSB WTRU acquires MIB/SIB1 from,
        elseif absoluteFrequencySSB in the FrequencyInfoDL-SIB IE is
        in the list of
        absoluteFrequencyOtherSSBs,
            the WTRU reads the SIB1 associated with the cell defining
            SSBs indicated in the
            absoluteFrequencySSB,
            the WTRU performs random access using the RACH resources
            associated with the
            cell defining SSB indicated in the absoluteFrequencySSB,
        Else (e.g., absoluteFrequencySSB = 0),
            the WTRU reads one or more SIB1 associated with the cell
            defining SSBs indicated in
            the absoluteFrequencyOtherSSBs,
            the WTRU may perform random access using the RACH
            resources associated with
            the SSB WTRU acquires MIB/SIB1 from or one of the cell
            defining SSBs listed in
            absoluteFrequencyOtherSSBs,
```

-continued

```
            alternatively, the WTRU may perform random access using the
            RACH resources
            among all or a subset of the cell defining SSBs provided in the
            cell (i.e., including the
            SSB WTRU acquires MIB/SIB1 from and some other cell
            defining SSBs indicated in
            the SIB1),
    else (i.e., multipleCellDefiningSSBs flag is unset or the WTRU is not
    capable of supporting multiple cell defining
    SSBs),
        if Kssb = 30 for FR1 or 14 for FR2 (cell defining SSB being
        removed),
            the WTRU reads the MIB and SIB1 information associated with
            the cell defining SSB indicated
            by the absoluteFrequencySSB,
            the WTRU performs random access using the RACH resources
            provided by the new SIB1,
        elseif Kssb ≤ 23 for FR1 or Kssb ≤ 11 for FR2 (cell defining SSB),
            the WTRU ignores absoluteFrequencySSB and proceeds with the
            initial access process based
            on the RACH information provided by the SIB1.
    If the WTRU is able to acquire the MIB but unable to acquire the
SIB1
    the following procedures may be
performed.
    if the multipleCellDefiningSSBs flag is set, and the WTRU is capable
    of supporting multiple cell defining SSBs,
        if the WTRU is camped on the cell and has stored MIB and SIB1
        information for other cell defining SSBs,
            the WTRU proceeds to read the MIB and SIB1 information from
            another stored cell defining
            SSB selected by the WTRU,
                This process may involve further iterations,
                The WTRU may select the SSB from the stored SIB1
                information based on its own
                observation of the frequency domain interference,
            if WTRU is able to decode MIB and SIB1 from any of the stored
            cell defining SSBs,
                the WTRU may perform random access using the RACH
                resources provided by the
                selected SIB1,
                alternatively, WTRU reads the absoluteFrequencyOtherSSBs in
                the selected SIB 1
                and performs random access alternately using the RACH
                resources among all or a
                subset of the cell defining SSBs that are deemed eligible,
            else,
                if the field intraFreqReselection in stored MIB is set to
                "allowed",
                    the WTRU scans the synchronization raster to select another
                    cell defining
                    SSB on the same cell or another cell on the same frequency,
                    whichever has
                    stronger SSB measurement results,
                else,
                    the WTRU scans the synchronization raster to find another
                    cell defining SSB
                    on the same cell,
        else (e.g., the WTRU is emerging and has no stored SIB1
        information),
            if the field intraFreqReselection in MIB is set to "allowed",
                the WTRU scans the synchronization raster to select another cell
                defining SSB on the
                same cell or another cell on the same frequency, whichever has
                stronger SSB
                measurement results,
            else,
                the WTRU scans the synchronization raster to find another cell
                defining SSB on the
                same cell,
    else (i.e., multipleCellDefiningSSBs flag is unset or WTRU is not
    capable of supporting multiple cell defining SSBs)
        if Kssb = 30 for FR1 or 14 for FR2 (cell defining SSB being
        removed),
            if the field intraFreqReselection in MIB is set to "allowed",
                the WTRU scans the synchronization raster to select another
                cell defining SSB on the
                same cell or another cell on the same frequency, whichever
                gives stronger SSB
                measurement results,
```

-continued

```
        else,
            the WTRU scans the synchronization raster to find another cell
            defining SSB on the
            same cell,
        elseif Kssb ≤ 23 for FR1 or Kssb ≤ 11 for FR2 (cell defining SSB),
            the WTRU considers the cell as barred and follow the associated
            procedures,
            if the field intraFreqReselection in MIB is set to "allowed",
                the WTRU may select another cell on the same frequency if
                re-selection criteria are
                fulfilled,
            else (the corresponding SSB is not cell defining),
                the WTRU may find the cell defining SSB as specified by the
                Kssb.
        If a WTRU is unable to acquire the MIB, the following procedure
        may be performed.
        if the WTRU is camped on the cell and has stored MIB and SIB1
        information for other cell defining SSBs,
            if the multipleCellDefiningSSBs flag in the stored MIB is set, and
            the WTRU is capable of supporting
            multiple cell defining SSBs,
                the WTRU proceeds to read the MIB and SIB1 information from
                another cell defining SSB
                selected by the WTRU,
                    This process may involve further iterations,
                    The WTRU may make the SSB selection from the stored SIB1
                    information based on
                    its own observation of the frequency domain interference,
                if WTRU is able to decode MIB and SIB1 from any of the stored
                cell defining SSBs,
                    the WTRU may perform random access using the RACH
                    resources provided by the
                    selected SIB1,
                    alternatively, WTRU reads the absoluteFrequencyOtherSSBs
                    in the selected SIB1 and
                    performs random access using the RACH resources among all
                    or a subset of the cell
                    defining SSBs that are deemed eligible,
                else,
                    if the field intraFreqReselection in stored MIB is set to
                    "allowed",
                        the WTRU scans the synchronization raster to select another
                        cell defining
                        SSB on the same cell or another cell on the same frequency,
                        whichever has
                        stronger SSB measurement results,
                    else,
                        the WTRU scans the synchronization raster to find another
                        cell defining SSB
                        on the same cell,
            else (i.e., multipleCellDefiningSSBs flag in the stored MIB is unset
            or WTRU is not capable of supporting
            multiple cell defining SSBs),
                the WTRU considers the cell as barred and performs barring as
                if intraFreqReselection is set
                to allowed, and follows the associated procedures,
                    the WTRU may select another cell on the same frequency if
                    the selection criteria are
                    fulfilled,
        else (e.g., the WTRU is emerging and has no stored SIB1 information),
            the WTRU considers the cell as barred and perform barring as if
            intraFreqReselection is set to allowed,
            and follows the associated procedures,
                the WTRU may select another cell on the same frequency if the
                selection criteria are fulfilled.
```

For RRC connected WTRUs, beam switching/recovery and mobility management is performed on the latest SSB the WTRU retrieves the MIB/SIB1 system information from (to be termed the WTRU specific "primary" cell defining SSB). The network may dynamically signal the RRC connected WTRUs to switch the "primary" SSB frequency location via dedicated RRC signaling. The existing absoluteFrequencySSB in the FrequencyInfoDL IE associated with the DownlinkConfigCommon IE may be used to indicate the new "primary" SSB frequency location for the WTRU. From the network point of view, different "primary" SSBs may be allocated to different WTRUs. Different signaling approaches such as MAC-CE may be considered to signal the "primary" SSB switching. After receiving the updated "primary" cell-defining SSB frequency location, the WTRU reads the MIB and SIB1 from the "primary" cell-defining SSB to retrieve absoluteFrequencyOtherSSBs and other system information.

In an example, time-frequency interleaved cell defining SSB for inter-cell SSB interference coordination may be used. Allocating a set of "orthogonal" cell defining SSB time-frequency interleaving patterns to different cells within an SSB coordinating set such that at any given SSB burst duration (within a 5 ms half frame) one SSB burst is transmitting among the set of coordinating cells. The mutual interference (due to the sidelobe) of SSB beam among different cells may be minimized, while maintaining the robustness of the 5G system operation in the presence of high-power interference.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method performed in a wireless transmit and receive unit (WTRU), the method comprising:
   detecting at least one cell defining (CD)-Synchronization Signal Burst (SSB) (CD-SSB);
   extracting information from the detected CD-SSB to determine a presence of other CD-SSBs;
   extracting an indication from the detected CD-SSB that the detected CD-SSB is to be removed;
   reading a System Information (SI) Block (SIB) associated with the detected CD-SSB to extract at least frequency location information associated with at least one other CD-SSB;
   reading, using the frequency location information, a SIB associated with the at least one other CD-SSB; and
   performing random access using Random Access Channel (RACH) resources corresponding to the read SIB associated with the at least one other CD-SSB.

2. The method of claim 1 further comprising:
   if the detected CD-SSB is to be removed and there are other CD-SSBs, reading at least one SI Block 1 (SIB1) associated with at least one other CD-SSB indicated by a SIB1 of the detected CD-SSB; and
   performing random access using RACH resources corresponding to the read at least one SIB1.

3. The method of claim 2 further comprising:
   if a SSB frequency location indicated in the SIB1 of the detected CD-SSB is in a list of SSB frequency locations of other CD-SSBs, reading the SIB1 associated with the CD-SSB indicated in the SIB1 of the detected CD-SSB; and perform random access using RACH resources corresponding to the read SIB1.

4. The method of claim 3 wherein the SSB frequency location indicated in the SIB1 associated with a CD-SSB is updated based on the CD-SSB being impacted by interference.

5. The method of claim 4 wherein the interference is by RADAR.

6. The method of claim 1 further comprising sending a flag indicating the ability to operate with multiple cell defining SSBs.

7. The method of claim 1 wherein transmission of a first of the CD-SSBs and a second of the CD-SSBs are interleaved in a time domain.

8. The method of claim 7 wherein the interleaving includes a frame offset and a half bit offset.

9. The method of claim 1 further comprising receiving at least one short message paged using a coreset of the at least one CD-SSB.

10. The method of claim 9 wherein the at least one short message is received within a Discontinuous Reception (DRX) cycle and the at least one short message indicates an SI modification notification.

11. A wireless transmit and receive unit (WTRU) comprising:

a transceiver; and a processor operably coupled to the transceiver, the transceiver and processor operating to:

detect at least one cell defining (CD)-Synchronization Signal Burst (SSB) (CD-SSB);

extract information from the detected CD-SSB to determine a presence of other CD-SSBs;

extract an indication from the detected CD-SSB that the detected CD-SSB is to be removed;

read a System Information (SI) Block (SIB) associated with the detected CD-SSB to extracting at least frequency location information associated with at least one other CD-SSB;

read, using the frequency location information, a SIB associated with the at least one other CD-SSB; and perform random access using Random Access Channel (RACH) resources corresponding to the read SIB associated with the at least one other CD-SSB.

12. The WTRU of claim 11 wherein the transceiver and processor further operate to:

if the detected CD-SSB is to be removed and there are other CD-SSBs, reading at least one SI Block 1 (SIB1) associated with at least one other CD-SSB indicated by a SIB1 of the detected CD-SSB; and perform random access using RACH resources corresponding to the read at least one SIB1.

13. The WTRU of claim 12 wherein the transceiver and processor further operate to:

if a SSB frequency location indicated in the SIB1 of the detected CD-SSB is in a list of SSB frequency locations of other CD-SSBs, read the SIB1 associated with the CD-SSB indicated in the SIB1 of the detected CD-SSB; and perform random access using RACH resources corresponding to the read SIB1.

14. The WTRU of claim 13 wherein the SSB frequency location indicated in the SIB1 associated with a CD-SSB is updated based on the CD-SSB being impacted by interference.

15. The WTRU of claim 14 wherein the interference is by RADAR.

16. The WTRU of claim 11 wherein the transceiver and processor further operate to send a flag indicating the ability to operate with multiple cell defining SSBs.

17. The WTRU of claim 11 wherein transmission of a first of the CD-SSBs and a second of the CD-SSBs are interleaved in a time domain.

18. The WTRU of claim 17 wherein the interleaving includes a frame offset and a half bit offset.

19. The WTRU of claim 11 wherein the transceiver and processor further operate to receive at least one short message paged using a coreset of the at least on CD-SSB.

20. The WTRU of claim 19 wherein the at least one short message is received within a Discontinuous Reception (DRX) cycle and the at least one short message indicates an SI modification notification.

* * * * *